(12) United States Patent
Unkrich

(10) Patent No.: US 8,238,129 B2
(45) Date of Patent: Aug. 7, 2012

(54) AC-DC CONVERTER CIRCUIT AND POWER SUPPLY

(75) Inventor: Mark Unkrich, Redwood City, CA (US)

(73) Assignee: Avago Technologies Wireless IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 12/763,445

(22) Filed: Apr. 20, 2010

(65) Prior Publication Data

US 2010/0202174 A1 Aug. 12, 2010

Related U.S. Application Data

(63) Continuation of application No. 11/371,762, filed on Mar. 9, 2006, now Pat. No. 7,746,677.

(51) Int. Cl.
*H02M 7/06* (2006.01)

(52) U.S. Cl. .......................... 363/125; 363/89

(58) Field of Classification Search .............. 363/44, 363/52, 81, 84, 89, 125, 126; 323/288
See application file for complete search history.

(56) References Cited

U.S. PATENT DOCUMENTS

| | | | |
|---|---|---|---|
| 3,174,122 A | 3/1965 | Fowler et al. | |
| 3,189,851 A | 6/1965 | Fowler | |
| 3,321,648 A | 5/1967 | Kolm | |
| 3,422,371 A | 1/1969 | Poirier et al. | |
| 3,568,108 A | 3/1971 | Poirier et al. | |
| 3,582,839 A | 6/1971 | Pim et al. | |
| 3,590,287 A | 6/1971 | Berlincourt et al. | |
| 3,610,969 A | 10/1971 | Clawson et al. | |
| 3,826,931 A | 7/1974 | Hammond | |
| 3,845,402 A | 10/1974 | Nupp | |
| 3,959,716 A * | 5/1976 | Gilbert et al. | ................ 323/288 |
| 4,084,217 A | 4/1978 | Brandli et al. | |
| 4,172,277 A | 10/1979 | Pinson | |
| 4,272,742 A | 6/1981 | Lewis | |
| 4,281,299 A | 7/1981 | Newbold | |
| 4,320,365 A | 3/1982 | Black et al. | |
| 4,355,408 A | 10/1982 | Scarrott | |
| 4,456,850 A | 6/1984 | Inoue et al. | |

(Continued)

FOREIGN PATENT DOCUMENTS

DE    10160617    6/2003

(Continued)

OTHER PUBLICATIONS

U.S. Appl. No. 10/971,169, filed Oct. 22, 2004, Larson III, John D., et al.

Al-Ahmad, M. et al., "Piezoelectric-Based Tunable Microstrip Shunt Resonator", *Proceedings of Asia-Pacific Microwave Conference 2006*.

Aoyama, Takayuki et al., "Diffusion of Boron, Phosphorous, Arsenic and Antimony in Thermally Grown SiliconDioxide", *Journal of The Electrochemical Society*, vol. 146, No. 5 1999 , 1879-1883.

(Continued)

*Primary Examiner* — Gary L Laxton

(57) ABSTRACT

An AC-DC converter, comprises: a first capacitor and a second capacitor; and a rectifier circuit connected to the first and second capacitor and operative to charge both the first and the second capacitor and to discharge the first capacitor independently of the second capacitor. The AC-DC converter circuit provides a rectified output voltage, and a duration of time that a current is drawn from the second capacitor is less than approximately 25% of a period of the rectified output voltage.

20 Claims, 11 Drawing Sheets

U.S. PATENT DOCUMENTS

| | | |
|---|---|---|
| 4,529,904 A | 7/1985 | Hattersley |
| 4,608,541 A | 8/1986 | Moriwaki et al. |
| 4,625,138 A | 11/1986 | Ballato |
| 4,640,756 A | 2/1987 | Wang et al. |
| 4,719,383 A | 1/1988 | Wang et al. |
| 4,769,272 A | 9/1988 | Byrne et al. |
| 4,798,990 A | 1/1989 | Henoch |
| 4,819,215 A | 4/1989 | Yokoyama et al. |
| 4,836,882 A | 6/1989 | Ballato |
| 4,841,429 A | 6/1989 | McClanahan et al. |
| 4,906,840 A | 3/1990 | Zdeblick et al. |
| 5,048,036 A | 9/1991 | Scifres et al. |
| 5,048,038 A | 9/1991 | Brennan et al. |
| 5,066,925 A | 11/1991 | Freitag |
| 5,075,641 A | 12/1991 | Weber et al. |
| 5,111,157 A | 5/1992 | Komiak |
| 5,118,982 A | 6/1992 | Inoue et al. |
| 5,129,132 A | 7/1992 | Zdeblick et al. |
| 5,162,691 A | 11/1992 | Mariani et al. |
| 5,166,646 A | 11/1992 | Avanic et al. |
| 5,185,589 A | 2/1993 | Krishnaswamy et al. |
| 5,214,392 A | 5/1993 | Kobayashi et al. |
| 5,233,259 A | 8/1993 | Krishnaswamy et al. |
| 5,241,209 A | 8/1993 | Sasaki |
| 5,241,456 A | 8/1993 | Marcinkiewicz et al. |
| 5,262,347 A | 11/1993 | Sands |
| 5,270,492 A | 12/1993 | Fukui |
| 5,294,898 A | 3/1994 | Dworsky et al. |
| 5,329,200 A | 7/1994 | Zaitsu |
| 5,361,077 A | 11/1994 | Weber |
| 5,382,930 A | 1/1995 | Stokes et al. |
| 5,384,691 A | 1/1995 | Neugebauer et al. |
| 5,384,808 A | 1/1995 | Van Brunt et al. |
| 5,448,014 A | 9/1995 | Kong et al. |
| 5,465,725 A | 11/1995 | Seyed-Boloforosh |
| 5,475,351 A | 12/1995 | Uematsu et al. |
| 5,548,189 A | 8/1996 | Williams |
| 5,587,620 A | 12/1996 | Ruby et al. |
| 5,589,858 A | 12/1996 | Kadowaki et al. |
| 5,594,705 A | 1/1997 | Connor et al. |
| 5,603,324 A | 2/1997 | Oppelt et al. |
| 5,633,574 A | 5/1997 | Sage |
| 5,671,242 A | 9/1997 | Takiguchi et al. |
| 5,692,279 A | 12/1997 | Mang et al. |
| 5,705,877 A | 1/1998 | Shimada |
| 5,714,917 A | 2/1998 | Ella |
| 5,789,845 A | 8/1998 | Wadaka et al. |
| 5,828,562 A | 10/1998 | Rivet |
| 5,831,846 A | 11/1998 | Jiang |
| 5,835,142 A | 11/1998 | Nakamura et al. |
| 5,853,601 A | 12/1998 | Krishaswamy et al. |
| 5,864,261 A | 1/1999 | Weber |
| 5,866,969 A | 2/1999 | Shimada et al. |
| 5,872,493 A | 2/1999 | Ella |
| 5,873,153 A | 2/1999 | Ruby et al. |
| 5,873,154 A | 2/1999 | Ylilammi et al. |
| 5,894,184 A | 4/1999 | Furuhashi et al. |
| 5,894,647 A | 4/1999 | Lakin |
| 5,910,756 A | 6/1999 | Ella |
| 5,932,953 A | 8/1999 | Drees et al. |
| 5,936,150 A | 8/1999 | Kobrin et al. |
| 5,953,479 A | 9/1999 | Zhou et al. |
| 5,955,926 A | 9/1999 | Uda et al. |
| 5,956,243 A * | 9/1999 | Mao .............................. 363/61 |
| 5,962,787 A | 10/1999 | Okada et al. |
| 5,969,463 A | 10/1999 | Tomita |
| 5,969,954 A | 10/1999 | Zaitsu |
| 5,982,297 A | 11/1999 | Welle |
| 6,001,664 A | 12/1999 | Swirhun et al. |
| 6,016,052 A | 1/2000 | Vaughn |
| 6,040,962 A | 3/2000 | Kanazawa et al. |
| 6,051,907 A | 4/2000 | Ylilammi |
| 6,060,818 A | 5/2000 | Ruby et al. |
| 6,087,198 A | 7/2000 | Panasik |
| 6,090,687 A | 7/2000 | Merchant et al. |
| 6,107,721 A | 8/2000 | Lakin |
| 6,111,341 A | 8/2000 | Hirama |
| 6,111,480 A | 8/2000 | Iyama et al. |
| 6,118,181 A | 9/2000 | Merchant et al. |
| 6,124,678 A | 9/2000 | Bishop et al. |
| 6,124,756 A | 9/2000 | Yaklin et al. |
| 6,131,256 A | 10/2000 | Dydyk |
| 6,150,703 A | 11/2000 | Cushman et al. |
| 6,187,513 B1 | 2/2001 | Katakura |
| 6,198,208 B1 | 3/2001 | Yano et al. |
| 6,215,375 B1 | 4/2001 | Larson, III et al. |
| 6,219,263 B1 | 4/2001 | Wuidart |
| 6,228,675 B1 | 5/2001 | Ruby et al. |
| 6,229,247 B1 | 5/2001 | Bishop |
| 6,252,229 B1 | 6/2001 | Hays et al. |
| 6,262,600 B1 | 7/2001 | Haigh et al. |
| 6,262,637 B1 | 7/2001 | Bradley et al. |
| 6,263,735 B1 | 7/2001 | Nakatani et al. |
| 6,265,246 B1 | 7/2001 | Ruby et al. |
| 6,278,342 B1 | 8/2001 | Ella |
| 6,292,336 B1 | 9/2001 | Horng et al. |
| 6,307,447 B1 | 10/2001 | Barber et al. |
| 6,307,761 B1 | 10/2001 | Nakagawa |
| 6,335,548 B1 | 1/2002 | Roberts et al. |
| 6,355,498 B1 | 3/2002 | Chan et al. |
| 6,366,006 B1 | 4/2002 | Boyd |
| 6,376,280 B1 | 4/2002 | Ruby et al. |
| 6,377,137 B1 | 4/2002 | Ruby |
| 6,384,697 B1 | 5/2002 | Ruby |
| 6,396,200 B2 | 5/2002 | Misu et al. |
| 6,407,649 B1 | 6/2002 | Tikka et al. |
| 6,414,569 B1 | 7/2002 | Nakafuku |
| 6,420,820 B1 | 7/2002 | Larson, III |
| 6,424,237 B1 | 7/2002 | Ruby et al. |
| 6,429,511 B2 | 8/2002 | Ruby et al. |
| 6,434,030 B1 | 8/2002 | Rehm et al. |
| 6,437,482 B1 | 8/2002 | Shibata |
| 6,441,539 B1 | 8/2002 | Kitamura et al. |
| 6,441,702 B1 | 8/2002 | Ella et al. |
| 6,462,631 B2 | 10/2002 | Bradley et al. |
| 6,466,105 B1 | 10/2002 | Lobl et al. |
| 6,466,418 B1 | 10/2002 | Horng et al. |
| 6,469,597 B2 | 10/2002 | Ruby et al. |
| 6,469,909 B2 | 10/2002 | Simmons |
| 6,472,954 B1 | 10/2002 | Ruby et al. |
| 6,476,536 B1 | 11/2002 | Pensala |
| 6,479,320 B1 | 11/2002 | Gooch |
| 6,483,229 B2 | 11/2002 | Larson, III et al. |
| 6,486,751 B1 | 11/2002 | Barber et al. |
| 6,489,688 B1 | 12/2002 | Baumann et al. |
| 6,492,883 B2 | 12/2002 | Liang et al. |
| 6,496,085 B2 | 12/2002 | Ella |
| 6,507,983 B1 | 1/2003 | Ruby et al. |
| 6,515,558 B1 | 2/2003 | Ylilammi |
| 6,518,860 B2 | 2/2003 | Ella et al. |
| 6,525,996 B1 | 2/2003 | Miyazawa |
| 6,528,344 B2 | 3/2003 | Kang |
| 6,530,515 B1 | 3/2003 | Glenn et al. |
| 6,534,900 B2 | 3/2003 | Aigner et al. |
| 6,542,055 B1 | 4/2003 | Frank et al. |
| 6,548,942 B1 | 4/2003 | Panasik |
| 6,548,943 B2 | 4/2003 | Kaitila et al. |
| 6,549,394 B1 | 4/2003 | Williams |
| 6,550,664 B2 | 4/2003 | Bradley et al. |
| 6,559,487 B1 | 5/2003 | Kang et al. |
| 6,559,530 B2 | 5/2003 | Hinzel et al. |
| 6,564,448 B1 | 5/2003 | Oura et al. |
| 6,566,956 B2 | 5/2003 | Ohnishi et al. |
| 6,566,979 B2 | 5/2003 | Larson, III et al. |
| 6,580,159 B1 | 6/2003 | Fusaro et al. |
| 6,583,374 B2 | 6/2003 | Knieser et al. |
| 6,583,688 B2 | 6/2003 | Klee et al. |
| 6,593,870 B2 | 7/2003 | Dummermuth et al. |
| 6,594,165 B2 | 7/2003 | Duerbaum et al. |
| 6,600,390 B2 | 7/2003 | Frank |
| 6,601,276 B2 | 8/2003 | Barber |
| 6,603,182 B1 | 8/2003 | Low et al. |
| 6,617,249 B2 | 9/2003 | Ruby et al. |
| 6,617,750 B2 | 9/2003 | Dummermuth et al. |
| 6,617,751 B2 | 9/2003 | Sunwoo et al. |
| 6,621,137 B1 | 9/2003 | Ma et al. |
| 6,630,753 B2 | 10/2003 | Malik et al. |

| | | |
|---|---|---|
| 6,635,509 B1 | 10/2003 | Ouellet |
| 6,639,872 B1 | 10/2003 | Rein |
| 6,651,488 B2 | 11/2003 | Larson, III et al. |
| 6,657,363 B1 | 12/2003 | Aigner |
| 6,668,618 B2 | 12/2003 | Larson, III et al. |
| 6,670,866 B2 | 12/2003 | Ella et al. |
| 6,693,500 B2 | 2/2004 | Yang et al. |
| 6,710,508 B2 | 3/2004 | Ruby et al. |
| 6,710,681 B2 | 3/2004 | Figueredo et al. |
| 6,713,314 B2 | 3/2004 | Wong et al. |
| 6,714,102 B2 | 3/2004 | Ruby et al. |
| 6,720,844 B1 | 4/2004 | Lakin |
| 6,720,846 B2 | 4/2004 | Iwashita et al. |
| 6,724,266 B2 | 4/2004 | Plazza et al. |
| 6,738,267 B1 | 5/2004 | Navas Sabater et al. |
| 6,774,746 B2 | 8/2004 | Whatmore et al. |
| 6,777,263 B1 | 8/2004 | Gan et al. |
| 6,787,048 B2 | 9/2004 | Bradley et al. |
| 6,788,170 B1 | 9/2004 | Kaitila et al. |
| 6,803,835 B2 | 10/2004 | Frank |
| 6,812,619 B1 | 11/2004 | Kaitila et al. |
| 6,828,713 B2 | 12/2004 | Bradley et al. |
| 6,842,088 B2 | 1/2005 | Yamada et al. |
| 6,842,089 B2 | 1/2005 | Lee |
| 6,853,534 B2 | 2/2005 | Williams |
| 6,873,065 B2 | 3/2005 | Haigh et al. |
| 6,873,529 B2 | 3/2005 | Ikuta |
| 6,874,211 B2 | 4/2005 | Bradley et al. |
| 6,874,212 B2 | 4/2005 | Larson, III |
| 6,888,424 B2 | 5/2005 | Takeuchi et al. |
| 6,900,705 B2 | 5/2005 | Nakamura et al. |
| 6,903,452 B2 | 6/2005 | Ma et al. |
| 6,906,451 B2 | 6/2005 | Yamada et al. |
| 6,911,708 B2 | 6/2005 | Park |
| 6,917,261 B2 | 7/2005 | Unterberger |
| 6,924,583 B2 | 8/2005 | Lin et al. |
| 6,924,717 B2 | 8/2005 | Ginsburg et al. |
| 6,927,651 B2 | 8/2005 | Larson, III et al. |
| 6,936,928 B2 | 8/2005 | Hedler et al. |
| 6,936,954 B2 | 8/2005 | Peczalski |
| 6,943,648 B2 | 9/2005 | Maiz et al. |
| 6,946,928 B2 | 9/2005 | Larson et al. |
| 6,954,121 B2 | 10/2005 | Bradley et al. |
| 6,963,257 B2 | 11/2005 | Ella et al. |
| 6,970,365 B2 | 11/2005 | Turchi |
| 6,975,183 B2 | 12/2005 | Aigner et al. |
| 6,977,563 B2 | 12/2005 | Komuro et al. |
| 6,985,052 B2 | 1/2006 | Tikka |
| 6,987,433 B2 | 1/2006 | Larson et al. |
| 6,989,723 B2 | 1/2006 | Komuro et al. |
| 6,998,940 B2 | 2/2006 | Metzger |
| 7,002,437 B2 | 2/2006 | Takeuchi et al. |
| 7,019,604 B2 | 3/2006 | Gotoh et al. |
| 7,019,605 B2 | 3/2006 | Larson, III |
| 7,026,876 B1 | 4/2006 | Esfandiari et al. |
| 7,053,456 B2 | 5/2006 | Matsuo |
| 7,057,476 B2 | 6/2006 | Hwu |
| 7,057,478 B2 | 6/2006 | Korden et al. |
| 7,064,606 B2 | 6/2006 | Louis |
| 7,084,553 B2 | 8/2006 | Ludwiczak |
| 7,091,649 B2 | 8/2006 | Larson, III et al. |
| 7,098,758 B2 | 8/2006 | Wang et al. |
| 7,102,460 B2 | 9/2006 | Schmidhammer et al. |
| 7,128,941 B2 | 10/2006 | Lee |
| 7,138,889 B2 | 11/2006 | Lakin |
| 7,161,448 B2 | 1/2007 | Feng et al. |
| 7,170,215 B2 | 1/2007 | Namba et al. |
| 7,173,504 B2 | 2/2007 | Larson |
| 7,187,254 B2 | 3/2007 | Su et al. |
| 7,209,374 B2 | 4/2007 | Noro |
| 7,212,083 B2 | 5/2007 | Inoue et al. |
| 7,212,085 B2 | 5/2007 | Wu |
| 7,230,509 B2 | 6/2007 | Stoemmer |
| 7,230,511 B2 | 6/2007 | Onishi et al. |
| 7,242,270 B2 | 7/2007 | Larson, III et al. |
| 7,259,498 B2 | 8/2007 | Nakatsuka et al. |
| 7,275,292 B2 | 10/2007 | Ruby et al. |
| 7,276,994 B2 | 10/2007 | Takeuchi et al. |
| 7,280,007 B2 | 10/2007 | Feng et al. |
| 7,281,304 B2 | 10/2007 | Kim et al. |
| 7,294,919 B2 | 11/2007 | Bai |
| 7,301,258 B2 | 11/2007 | Tanaka |
| 7,310,861 B2 | 12/2007 | Aigner et al. |
| 7,332,985 B2 | 2/2008 | Larson, III et al. |
| 7,367,095 B2 | 5/2008 | Larson, III et al. |
| 7,368,857 B2 | 5/2008 | Tanaka |
| 7,369,013 B2 | 5/2008 | Fazzio et al. |
| 7,388,318 B2 | 6/2008 | Yamada et al. |
| 7,388,454 B2 | 6/2008 | Ruby et al. |
| 7,388,455 B2 | 6/2008 | Larson, III |
| 7,408,428 B2 | 8/2008 | Larson, III |
| 7,414,349 B2 | 8/2008 | Sasaki |
| 7,414,495 B2 | 8/2008 | Iwasaki et al. |
| 7,423,503 B2 | 9/2008 | Larson, III et al. |
| 7,425,787 B2 | 9/2008 | Larson, III |
| 7,439,824 B2 | 10/2008 | Aigner |
| 7,463,499 B2 | 12/2008 | Larson, III |
| 7,545,532 B2 | 6/2009 | Muramoto |
| 7,746,677 B2 * | 6/2010 | Unkrich ..................... 363/125 |
| 2002/0000646 A1 | 1/2002 | Gooch et al. |
| 2002/0030424 A1 | 3/2002 | Iwata |
| 2002/0063497 A1 | 5/2002 | Panasik |
| 2002/0070463 A1 | 6/2002 | Chang et al. |
| 2002/0121944 A1 | 9/2002 | Larson, III et al. |
| 2002/0121945 A1 | 9/2002 | Ruby et al. |
| 2002/0126517 A1 | 9/2002 | Matsukawa et al. |
| 2002/0140520 A1 | 10/2002 | Hikita et al. |
| 2002/0152803 A1 | 10/2002 | Larson, III et al. |
| 2002/0190814 A1 | 12/2002 | Yamada et al. |
| 2003/0001251 A1 | 1/2003 | Cheever et al. |
| 2003/0006502 A1 | 1/2003 | Karpman |
| 2003/0011285 A1 | 1/2003 | Ossmann |
| 2003/0011446 A1 | 1/2003 | Bradley |
| 2003/0051550 A1 | 3/2003 | Nguyen et al. |
| 2003/0087469 A1 | 5/2003 | Ma |
| 2003/0102776 A1 | 6/2003 | Takeda et al. |
| 2003/0111439 A1 | 6/2003 | Fetter et al. |
| 2003/0128081 A1 | 7/2003 | Ella et al. |
| 2003/0132493 A1 | 7/2003 | Kang et al. |
| 2003/0132809 A1 | 7/2003 | Senthilkumar et al. |
| 2003/0141946 A1 | 7/2003 | Ruby et al. |
| 2003/0179053 A1 | 9/2003 | Aigner et al. |
| 2003/0205948 A1 | 11/2003 | Lin et al. |
| 2003/0227783 A1 | 12/2003 | Canova et al. |
| 2004/0016995 A1 | 1/2004 | Kuo et al. |
| 2004/0017130 A1 | 1/2004 | Wang et al. |
| 2004/0036449 A1 | 2/2004 | Bean et al. |
| 2004/0056735 A1 | 3/2004 | Nomura et al. |
| 2004/0092234 A1 | 5/2004 | Pohjonen |
| 2004/0124952 A1 | 7/2004 | Tikka |
| 2004/0129079 A1 | 7/2004 | Kato et al. |
| 2004/0150293 A1 | 8/2004 | Unterberger |
| 2004/0150296 A1 | 8/2004 | Park et al. |
| 2004/0166603 A1 | 8/2004 | Carley et al. |
| 2004/0195937 A1 | 10/2004 | Matsubara et al. |
| 2004/0212458 A1 | 10/2004 | Lee |
| 2004/0257171 A1 | 12/2004 | Park et al. |
| 2004/0257172 A1 | 12/2004 | Schmidhammer et al. |
| 2004/0263287 A1 | 12/2004 | Ginsburg et al. |
| 2005/0012570 A1 | 1/2005 | Korden et al. |
| 2005/0023931 A1 | 2/2005 | Bouche et al. |
| 2005/0030126 A1 | 2/2005 | Inoue et al. |
| 2005/0036604 A1 | 2/2005 | Scott et al. |
| 2005/0057117 A1 | 3/2005 | Nakatsuka et al. |
| 2005/0057324 A1 | 3/2005 | Onishi et al. |
| 2005/0068124 A1 | 3/2005 | Stoemmer |
| 2005/0093396 A1 | 5/2005 | Larson, III et al. |
| 2005/0093653 A1 | 5/2005 | Larson, III |
| 2005/0093654 A1 | 5/2005 | Larson, III et al. |
| 2005/0093655 A1 | 5/2005 | Larson, III et al. |
| 2005/0093657 A1 | 5/2005 | Larson, III et al. |
| 2005/0093658 A1 | 5/2005 | Larson, III et al. |
| 2005/0093659 A1 | 5/2005 | Larson, III et al. |
| 2005/0104690 A1 | 5/2005 | Larson |
| 2005/0110598 A1 | 5/2005 | Larson, III |
| 2005/0128030 A1 | 6/2005 | Larson, III et al. |
| 2005/0140466 A1 | 6/2005 | Larson, III et al. |
| 2005/0167795 A1 | 8/2005 | Higashi |

| | | | |
|---|---|---|---|
| 2005/0193507 | A1 | 9/2005 | Ludwiczak |
| 2005/0206271 | A1 | 9/2005 | Higuchi et al. |
| 2005/0206483 | A1 | 9/2005 | Pashby et al. |
| 2005/0218488 | A1 | 10/2005 | Matsuo |
| 2006/0071736 | A1 | 4/2006 | Ruby et al. |
| 2006/0081048 | A1 | 4/2006 | Mikado et al. |
| 2006/0087199 | A1 | 4/2006 | Larson, III et al. |
| 2006/0103492 | A1 | 5/2006 | Feng et al. |
| 2006/0119453 | A1 | 6/2006 | Fattinger et al. |
| 2006/0125489 | A1 | 6/2006 | Feucht et al. |
| 2006/0132262 | A1 | 6/2006 | Fazzio et al. |
| 2006/0164183 | A1 | 7/2006 | Tikka |
| 2006/0185139 | A1 | 8/2006 | Larson, III et al. |
| 2006/0197411 | A1 | 9/2006 | Hoen et al. |
| 2006/0238070 | A1 | 10/2006 | Costa et al. |
| 2006/0284707 | A1 | 12/2006 | Larson et al. |
| 2006/0290446 | A1 | 12/2006 | Aigner et al. |
| 2007/0037311 | A1 | 2/2007 | Izumi et al. |
| 2007/0080759 | A1 | 4/2007 | Jamneala et al. |
| 2007/0085447 | A1 | 4/2007 | Larson, III |
| 2007/0085631 | A1 | 4/2007 | Larson, III et al. |
| 2007/0085632 | A1 | 4/2007 | Larson, III et al. |
| 2007/0086080 | A1 | 4/2007 | Larson, III et al. |
| 2007/0086274 | A1 | 4/2007 | Nishimura et al. |
| 2007/0090892 | A1 | 4/2007 | Larson, III |
| 2007/0170815 | A1 | 7/2007 | Unkrich |
| 2007/0171002 | A1 | 7/2007 | Unkrich |
| 2007/0176710 | A1 | 8/2007 | Jamneala et al. |
| 2007/0205850 | A1 | 9/2007 | Jamneala et al. |
| 2007/0279153 | A1 | 12/2007 | Ruby |
| 2008/0055020 | A1 | 3/2008 | Handtmann |
| 2008/0297279 | A1 | 12/2008 | Thalhammer et al. |
| 2008/0297280 | A1 | 12/2008 | Thalhammer et al. |

FOREIGN PATENT DOCUMENTS

| | | |
|---|---|---|
| EP | 231892 | 8/1987 |
| EP | 0637875 | 2/1995 |
| EP | 689254 | 12/1995 |
| EP | 0865157 | 9/1998 |
| EP | 880227 | 11/1998 |
| EP | 1047189 | 10/2000 |
| EP | 1096259 | 5/2001 |
| EP | 1100196 | 5/2001 |
| EP | 1180494 | 2/2002 |
| EP | 1249932 | 10/2002 |
| EP | 1258989 | 11/2002 |
| EP | 1258990 | 11/2002 |
| EP | 1517443 | 3/2005 |
| EP | 1517444 | 3/2005 |
| EP | 1528674 | 5/2005 |
| EP | 1528675 | 5/2005 |
| EP | 1528676 | 5/2005 |
| EP | 1528677 | 5/2005 |
| EP | 1542362 | 6/2005 |
| EP | 1557945 | 7/2005 |
| EP | 1575165 | 9/2005 |
| EP | 0973256 | 9/2006 |
| GB | 1207974 | 10/1970 |
| GB | 2013343 | 8/1979 |
| GB | 2411239 | 8/2005 |
| GB | 2418791 | 4/2006 |
| GB | 2427773 | 1/2007 |
| JP | 61054686 | 3/1986 |
| JP | 06005944 | 1/1994 |
| JP | 2002/217676 | 8/2002 |
| JP | 2003/124779 | 4/2003 |
| WO | WO-98/16957 | 4/1998 |
| WO | WO-01/06647 | 1/2001 |
| WO | WO-01/99276 | 12/2001 |
| WO | WO-02/103900 | 12/2002 |
| WO | WO-03/030358 | 4/2003 |
| WO | WO-03/043188 | 5/2003 |
| WO | WO-03/050950 | 6/2003 |
| WO | WO-03/058809 | 7/2003 |
| WO | WO-2004/034579 | 4/2004 |
| WO | WO-2004/051744 | 6/2004 |
| WO | WO-2004/102688 | 11/2004 |
| WO | WO-2005/043752 | 5/2005 |
| WO | WO-2005/043753 | 5/2005 |
| WO | WO-2005/043756 | 5/2005 |
| WO | WO-2006/018788 | 2/2006 |

OTHER PUBLICATIONS

Auld, B. A., "Acoustic Resonators", *Acoustic Fields and Waves in Solids, Second Edition*, vol. II 1990, 250-259.

Bauer, L. O. et al., "Properties of Silicon Implanted with Boron Ions through Thermal Silicon Dioxide", *Solid State Electronics*, vol. 16, No. 3 Mar. 1973, 289-300.

Choi, Sungjin et al., "Design of Half-Bridge Piezo-Transformer Converters in the AC Adapter Applications", *APEC 2005, IEEE* Mar. 2005, 244-248.

Coombs, Clyde F., "Electronic Instrument Handbook", *Second Edition, McGraw-Hill, Inc.* 1995, pp. 5.1 to 5.29.

Fattinger, G. G. et al., "Coupled Bulk Acoustic Wave Resonator Filters: Key technology for single-to-balanced RF filters", 0-7803-8331-1/4/W20.00; *IEEE MTT-S Digest* 2004, 927-929.

Hadimioglu, B. et al., ""Polymer Films as Acoustic Matching Layers".", *1990 IEEE Ultrasonics Symposium Proceedings*, vol. 3 PP. [Previously submitted as "Polymer Files as Acoustic Matching Layers, 1990 IEEE Ultrasonics Symposium Proceeding. vol. 4 pp. 1227-1340, Dec. 1990", Considered by Examiner on Mar. 20, 2007 Dec. 1990, 1337-1340.

Hara, K., "Surface Treatment of Quartz Oscillator Plate by Ion Implantation", *Oyo Buturi*, vol. 47, No. 2 Feb. 1978, 145-146.

Holzlohner, Ronald et al., "Accurate Calculation of Eye Diagrams and Bit Error Rates in Optical Transmission Systems Using Linearization", *Journal of Lightwave Technology*, vol. 20, No. 3, Mar. 2002, pp. 389-400.

Ivensky, Gregory et al., "A Comparison of Piezoelectric Transformer AC/DC Converters with Current Doubler and voltage Doubler Rectifiers", *IEEE Transaction on Power Electronics*, vol. 19, No. 6, Nov. 2004.

Jiang, Yimin et al., "A Novel Single-Phase Power Factor Correction Scheme", *IEEE* 1993, 287-292.

Jung, Jun-Phil et al., "Experimental and Theoretical Investigation on the Relationship Between AlN Properties and AlN-Based FBAR Characteristics", *2003 IEEE International Frequency Control Symposium and PDA Exhibition Jointly with the 17th European Frequency and Time Forum* Sep. 3, 2003, 779-784.

Krishnaswamy, S.V. et al., "Film Bulk Acoustic Wave Resonator Technology", May 29, 1990, 529-536.

Lakin, K.M., "Bulk Acoustic Wave Coupled Resonator Filters", *2002 IEEE International Frequency Control Symposium and PDA Exhibition* May 2002, 8-14.

Lakin, K.M., "Coupled Resonator Filters", *2002 IEEE Ultrasonics Symposium* Mar. 2, 2002, 901-908.

Lakin, K.M. et al., "High Performance Stacked Crystal Filters for GPS and Wide Bandwidth Applications", *2001 IEEE Ultrasonics Symposium* Jan. 1, 2001, 833-838.

Lakin, K. M. et al., "Temperature Compensated Bulk Acoustic Thin Film Resonators", *IEEE Ultrasonics Symposium*, San Juan, Puerto Rico Oct. 2000, 855-858.

Lakin, K.M., "Thin Film BAW Filters for Wide Bandwidth and High Performance Applications", *IEEE Microwave Symposium Digest*; vol. 2 Jun. 6-11, 2004, 923-926.

Lakin, K. M., "Thin Film Resonators and Filters", *IEEE Untrasonics Symposium*, Caesar's Tahoe, NV Oct. 1999, 895-906.

Lakin, et al., "Wide Bandwidth Thin Film BAW Filters", *2004 IEEE Ultrasonics Symposium*, vol. 1, Aug. 2004, 407-410.

Larson III, John D. et al,, "Measurement of Effective Kt2,Q,Rp,Rs vs. Temperature for Mo/AlN FBAR Resonators", *IEEE Ultrasonics Symposium* 2002, 939-943.

Li, Yunxiu et al., "AC-DC Converter with Worldwide Range Input Voltage by Series and Parallel Piezoelectric Transformer Connection", *35th Annual IEEE Power Electronics Specialists Conference* 2004.

Lobl, H.P. et al., "Piezoelectric Materials for BAW Resonators and Filters", *2001 IEEE Ultrasonics Symposium* Jan. 1, 2001, 807-811.

Martin, Steven J. et al., "Development of a Low Dielectric Constant Polymer for the Fabrication of Integrated Circuit Interconnect", *12 Advanced Materials* Dec. 23, 2000, 1769-1778.

Navas, J. et al., "Miniaturised Battery Charger using Piezoelectric Transformers", *IEEE* 2001, 492-496.

Ng, J. et al, "The Diffusion Ion-Implanted Boron in Silicon Dioxide", *AIP Conf. Proceedings*, No. 122 1984, 20-33.

Ohta, S. et al., "Temperature Characteristics of Solidly Mounted Piezoelectric Thin Film Resonators", *IEEE Ultrasonics Symposium*, Honolulu, HI Oct. 2003, 2011-2015.

Pang, W. et al., "High Q Single-Mode High-Tone Bulk Acoustic Resonator Integrated With Surface-Machined FBAR Filter", *Microwave Symposium Digest, IEEE MTT-S International* 2005, 413-416.

Parker, T. E. et al., "Temperature-Compensated Surface Acoustic-Wave Devices with SiO2 Film Overlays", *J. Appl. Physics*, vol. 50 1360-1369, Mar. 1979.

Reinhardt, Alexandre et al., "Design of Coupled Resonator Filters Using Admittance and Scattering Matrices", *2003 IEEE Ultrasonics Symposium* May 3, 2003, 1428-1431.

Ruby, R. C., "MicroMachined Thin Film Bulk Acoustic Resonators", *IEEE International Frequency Control Symposium* 1994, 135-138.

Ruby, R. et al., "The Effect of Perimeter Geometry on FBAR Resonator Electrical Performance", *Microwave Symposium Digest, 2005 IEEE MTT-S International* Jun. 12, 2005, 217-221.

Sanchez, A.M. et al., "Mixed analytical and numerical design method for piezoelectric transformers", *IEEE,PESX* Jun. 2003, 841-846.

Schuessler, Hans H., "Ceramic Filters and Resonators", *Reprinted from IEEE Trans. Sonics Ultrason.*, vol. SU-21 Oct. 1974, 257-268.

Spangenberg, B. et al., "Dependence of the Layer Resistance of Boron Implantation in Silicon and the Annealing Conditions", *Comptus Rendus de l'Academic Bulgare des Sciences*, vol. 33, No. 3 1980, 325-327.

Tiersten, H. F. et al., "An Analysis of Thickness-Extensional Trapped Energy Resonant Device Structures with Rectangular Electrodes in the Piezoelectric Thin Film on Silicon Configuration", *J. Appl. Phys.* 54 (10) Oct. 1983, 5893-5910.

Topich, J. A. et al., "Effects of Ion Implanted Flourine in Silicon Dioxide", *Nuclear Instr. and Methods, Cecon Rec*, Cleveland, OH May 1978, 70-73.

Tsubbouchi, K. et al., "Zero Temperature coefficient Surface Acoustic Wave Devices using Epitaxial AIN Films", *IEEE Ultrasonic symposium*, San Diaego, CA, 1082 1982, 240-245.

Vasic, D et al., "A New Method to Design Piezoelectic Transformer Used in MOSFET & IGBT Drive Circuits", *IEEE 34th Annual Power Electronics Specialists Conference*, 2003 vol. 1 Jun. 15-19,03, 307-312.

Vasic, D et al., "A New MOSFET & IGBT Gate Drive Insulated by a Piezoelectric Transformer", *IEEE 32 nd Annual Power Electronics Specialists Conference*, 2001 vol. 3, 1479-1484.

Yang, C.M. et al., "Highly C Axis Oriented AIN Film Using MOCVD for 5GHx Band FBAR Filter", *2003 IEEE Ultrasonics Symposium* Oct. 5, 2003, pp. 170-173.

\* cited by examiner

AC-DC CONVERTER CIRCUIT AND POWER SUPPLY

CROSS-REFERENCE TO RELATED APPLICATIONS

The present application is related to commonly assigned U.S. patent application Ser. No. 11/371,762 now U.S. Pat. No. 7,746,677, entitled "Power Supply and Electronic Device Having Integrated Power Supply" to Mark Unkrich, et al. The present application is a continuation of commonly owned application Ser. No. 11/371,762 now U.S. Pat. No. 7,746,677 filed on Mar. 9, 2006 (hereafter the 'parent application'). Priority is claimed under 35 U.S.C. §120 to the parent application. The entire disclosures of the related application and the parent application are specifically incorporated herein by reference.

BACKGROUND

Portable electronic devices are ubiquitous in society. For example, electronic devices such as telephones, computers, radios and televisions have all evolved from comparatively large stationary devices that connected to alternating current (AC) power in the home or office to increasingly smaller portable devices adapted to operate on direct current (DC) power that is normally connected directly to the device. Often, the DC power source is a battery that can be charged and recharged repeatedly for reuse. The ability to recharge the battery is both economically and environmentally beneficial.

Power supplies are devices adapted to convert an AC input to a DC output. For example, power supplies are used to recharge batteries as well as to allow devices that operate on DC power to be connected to an AC source, such as a wall plug in a home or office.

In a typical application, the AC-DC converter provides output current or power to the load. For example, the power to the load may be to charge a battery in the electronic device, the power for operation of the portable electronic device, or both.

The power delivered to the output is delivered from the AC input through a rectifier initially. A storage capacitor is provided in the AC-DC converter circuit to store energy during the input voltage periodic cycle, filter the rectified voltage, and prevent the voltage waveform from the rectifier from falling below the threshold voltage necessary to deliver the power to the rest of the AC-DC power converter and ultimately to the output load. Without the energy storage capacitor to hold the rectified voltage, the rectified voltage waveform would consist of rectified half wave sinusoids and the voltage would consistently fall below the threshold voltage.

The energy stored on the energy storage capacitor is proportional to the capacitance times the square of the voltage stored on the capacitor. Power delivered to the output is the first derivative with respect to time of the energy delivered to the output. Typically, the capacitor size is proportional to the output power requirement and to the time interval during which the capacitor is not being charged during the half cycles of the low frequency AC line current. The capacitor must maintain voltage to the load during the 'falling' half portion of this half wave rectified voltage signal. In many applications the AC line voltage is at frequencies of 50 Hz and 60 Hz, and the half-wave rectified voltages are 100 Hz and 120 Hz, respectively. As such, the capacitor must maintain the voltage for about half of the period of a 120 Hz signal, which equates to a time interval of about 4.2 milliseconds.

Notably, during the falling half portion of the rectified voltage signal, the voltage drops over time. This voltage drop is referred to as voltage 'droop.' In order to maintain the voltage output to the load above the threshold, the magnitude of the droop is controlled over the half-period. In known circuits, the magnitude of the voltage droop is maintained at an acceptable level by providing an energy storage capacitor with a relatively large capacitance. In addition, the power requirements of the energy storage capacitor are rather large in many known applications. Relatively large capacitance, or relatively large power requirements, or both, can result in a dimensionally large capacitor needed in the AC-DC power converter circuit. With the ever-decreasing size of electronic devices, dimensionally large electronic components are undesirable.

What is needed, therefore, is an AC-DC power converter circuit that overcomes at least the shortcomings of known power supplies described above.

SUMMARY

In accordance with an example embodiment, a power supply includes an AC-DC converter circuit. The AC-DC converter circuit includes a first capacitor and a second capacitor; and a rectifier circuit connected to the first and second capacitor and operative to charge both the first and the second capacitor and to discharge the first capacitor independently of the second capacitor. In addition, the power supply includes an acoustic transformer.

In accordance with another example embodiment, an AC-DC converter includes a first capacitor and a second capacitor; a rectifier circuit connected to the first and second capacitor and operative to charge both the first and the second capacitor and to discharge the first capacitor independently of the second capacitor. The AC-DC converter circuit of the example embodiment provides a rectified output voltage, and a duration of time that a current is drawn from the second capacitor is less than approximately 25% of a period of the rectified output voltage.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DEFINED TERMINOLOGY

The terms 'a' or 'an', as used herein are defined as one or more than one.

The term 'plurality' as used herein is defined as two or more than two.

The term 'integrated' is defined herein as made into a whole by bringing parts together; unified.

DETAILED DESCRIPTION

In the following detailed description, for purposes of explanation and not limitation, specific details are set forth in order to provide a thorough understanding of example embodiments according to the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparati and methods may be omitted so as to not obscure the description of the example embodiments. Such methods and apparati are clearly within the scope of the present teachings.

Figure 1:
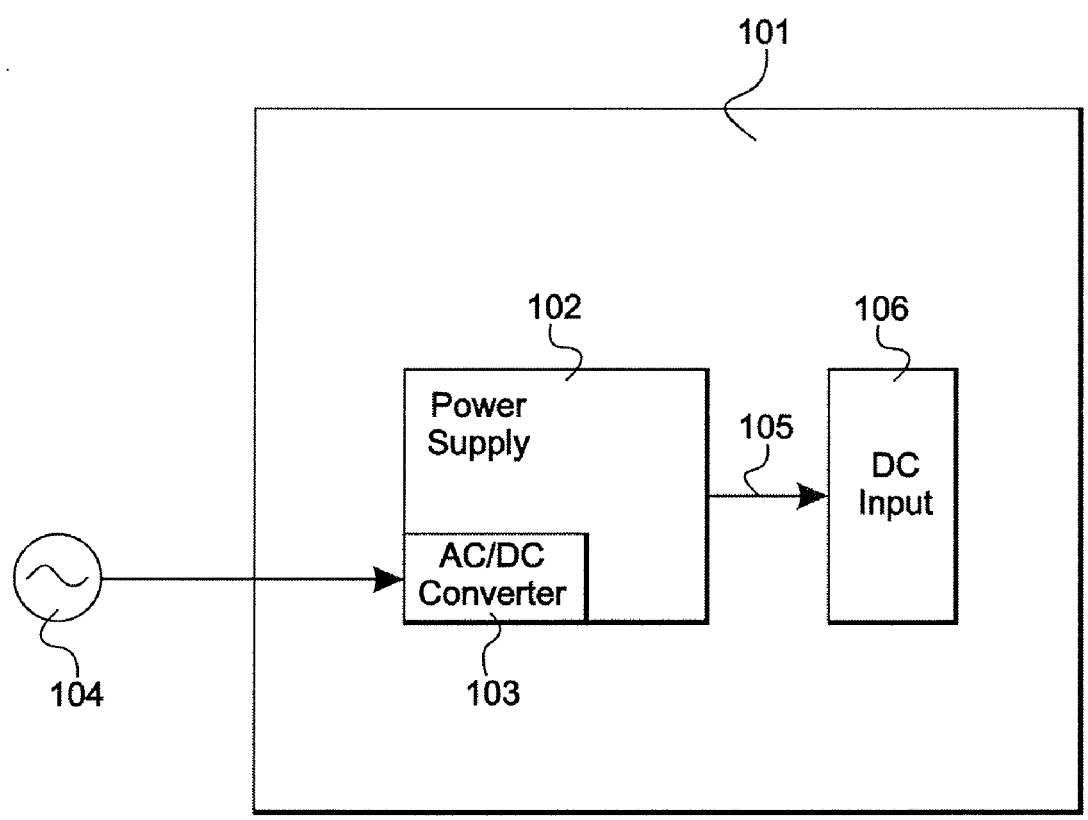
FIG. 1 is a simplified block diagram of a portable electronic device including a power supply in accordance with an example embodiment.

FIG. 1 is a simplified block diagram of a portable electronic device ('device') 101 in accordance with an example embodiment. The device 101 includes an integrated power supply 102, which includes an AC-DC converter 103. The AC-DC converter 103 receives an AC input voltage from an AC source 104. The power supply 102 converts the AC voltage into a DC output voltage 105 that is received at a DC input 106. The DC input 106 may be the power input used to power the electronic device 101 or to charge a battery (not shown), or both.

In certain embodiments, the power supply 102 may be integrated into the device 101 and the battery may be integrated into the device 101 as a separate component. In specific embodiments, the power supply 102 and battery are integrated into the device 101, but removable/detachable from the device. In other embodiments, the battery is integrated into the power supply 102. In these embodiments, the power supply 102 including the battery may be integrated into the device 101. In specific embodiments, the power supply 102 with the integrated battery comprises a module that is removable from the device 101. In still other embodiments, the power supply 102 is a stand-alone device and is not integrated into the device 101.

Many details of the portable electronic device 101, the power supply 102 and the integration of the components described above into the device 101, or into the power supply 102, or both, are omitted to avoid obscuring the presently described embodiments. These details may be found in the incorporated patent application to Unkrich, et al.

Figure 2A:
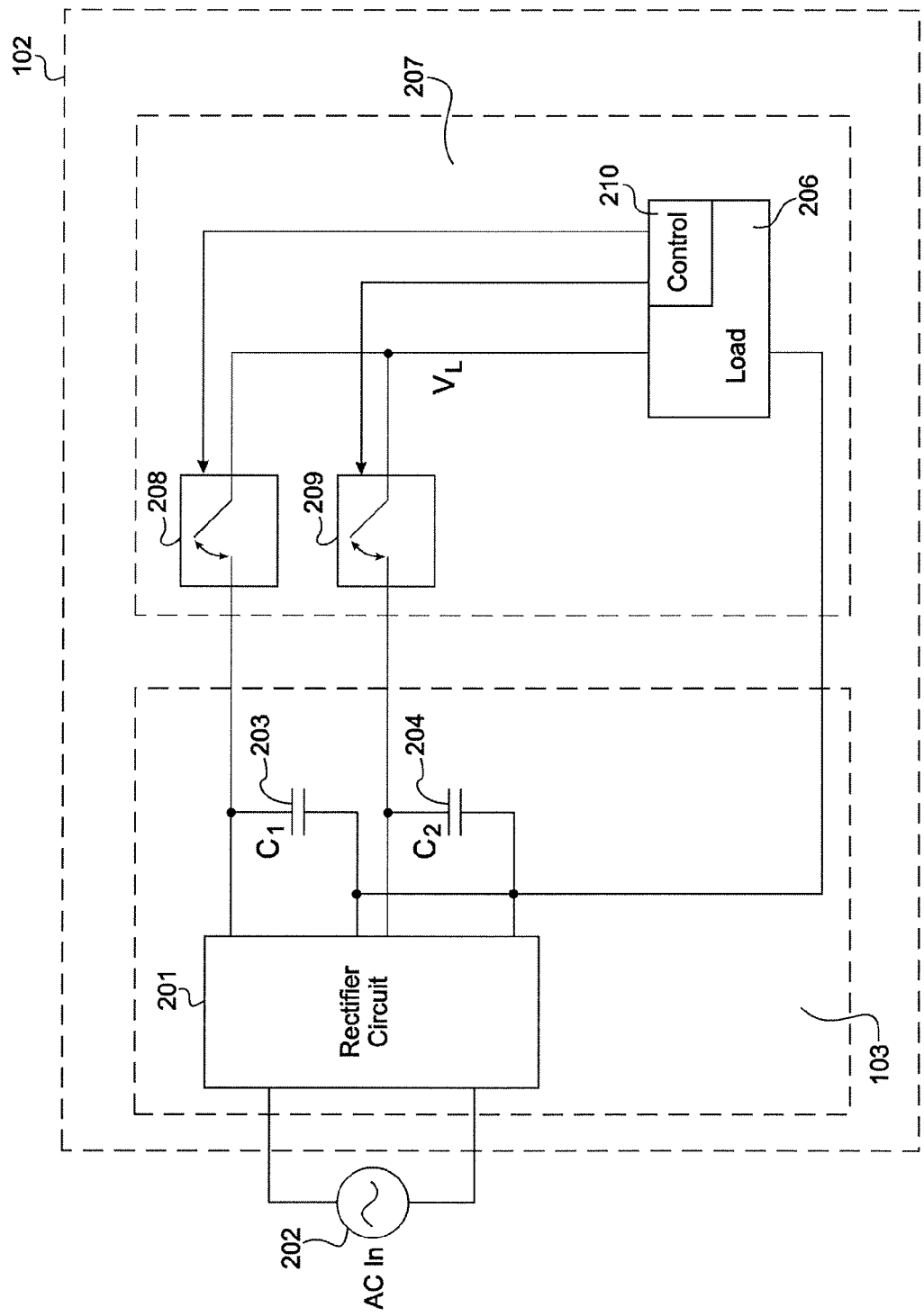
FIGS. 2A-2C are simplified circuit diagrams of a AC-to-DC converter circuits in accordance with example embodiments.

FIG. 2A is schematic block diagram of a power supply 102 including the AC-DC converter circuit 103 in accordance with an example embodiment. The AC-DC converter circuit 103 includes a rectifier circuit 201. The rectifier circuit 201 is connected to an AC source 202, which is not a component of the power supply 102. The AC-DC converter circuit 103 includes a first capacitor ($C_1$) 203 and a second capacitor ($C_2$) 204, which are charged by the rectifier circuit 201. The first and second capacitors 203 and 204 have voltages $V_{C1}$ and $V_{C2}$, respectively, and are adapted to allow the first capacitor 203 to discharge independently of the second capacitor 204.

As described more fully herein, the second capacitor 204 provides current to a load 206 and other components of the power supply 102 when the rectified AC line voltage on capacitor 203 drops below a threshold voltage level.

The load 206 on the AC-DC converter circuit 103 represents the rest of the functionality and power transfer to the output of the power supply circuit 102 converting the rectified voltages on capacitors 203 and 204 to the DC output 105 of FIG. 1. Beneficially, the dimensional size of the first and second capacitors 203, 204 are smaller compared to energy storage capacitors included in known AC-DC converter circuits for similar output power levels of power supply 102, fostering size reduction of the power supply 102 and integration of the power supply 102 into portable electronic devices, for example.

The power supply 102 includes a switching apparatus 207. In accordance with presently described embodiments, the switching apparatus 207 is conceptual. To this end, the switching apparatus 207 of the example embodiments represents the switching of drawing power from the energy stored on the first capacitor 203 or the second capacitor 204 depending upon the phase of the AC input voltage and is carried out via components of the load 206, which may be other components of the power supply 102. Further description of the switching apparatus 207 is provided in connection with the example embodiments of FIGS. 3A-5C.

The load 206 includes a control 210, which conceptually represents the control of the power loading. The control 210 controls a first switch 208 and a second switch 209, which conceptually represent the selection of power loading sources from the AC-DC converter circuit 103. The load 206 includes the combined loading of the remaining components of the power supply 102 and the loading of the DC output voltage 105 connected to the power supply 102.

Figure 2B:
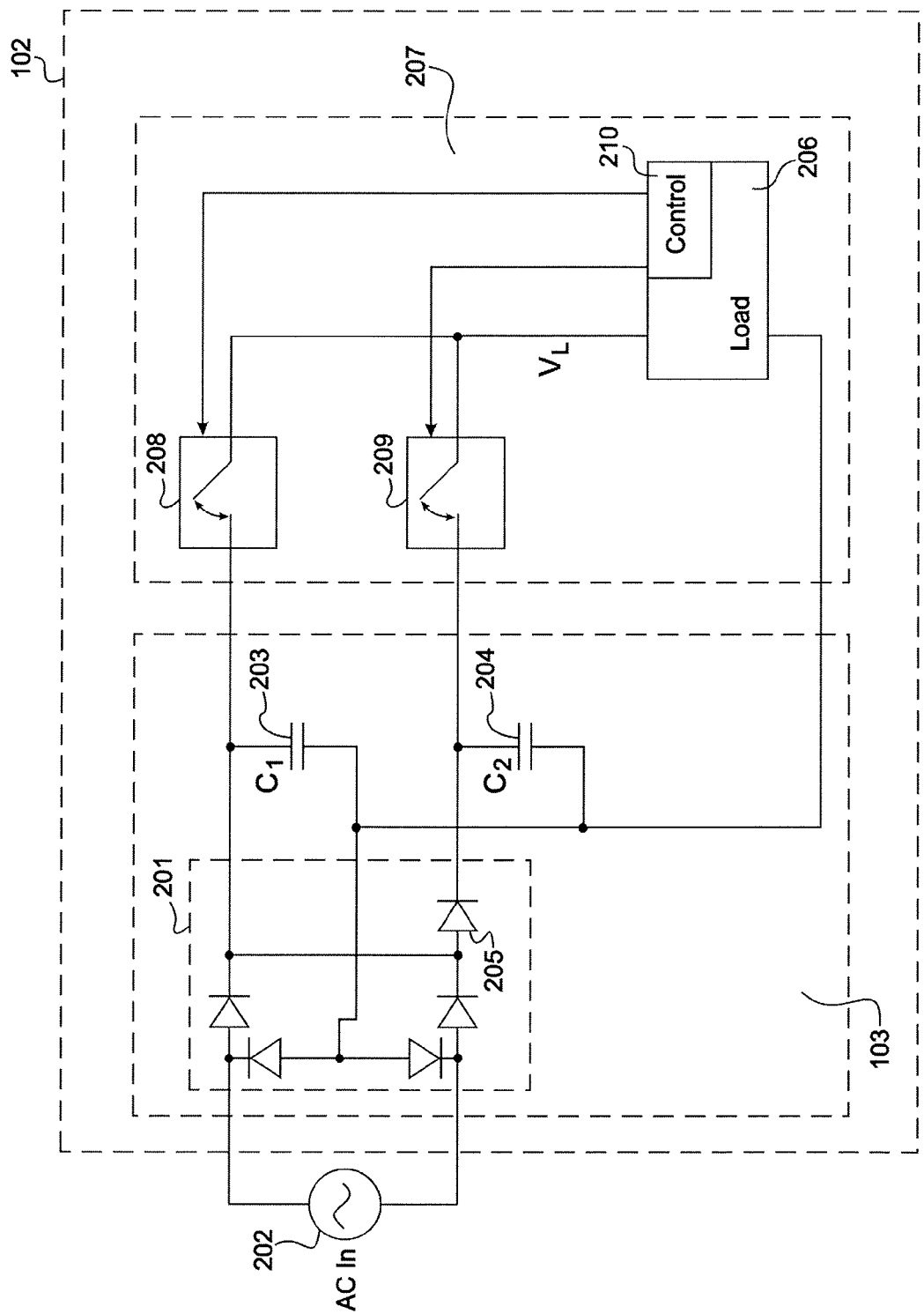

FIG. 2B is a simplified schematic diagram of a power supply 102 in accordance with an example embodiment. The power supply 102 includes the rectifier circuit 201 connected to an AC source 202. In the present embodiment, the rectifier circuit 201 includes a full bridge rectifier circuit connected to a junction diode 205. The power supply 102 also includes AC-DC converter circuit 103, which includes first capacitor 203, second capacitor 204 and rectifier circuit 201. As such, the series connection of the diode 205 and second capacitor 204 is in parallel with the first capacitor 203.

In embodiments of the present teachings, the first capacitor 203 is optional or has a comparatively small capacitance. Notably, some line filtering of noise spikes on the AC input requires inclusion of the first capacitor 203. As such, in certain applications the first capacitor 203 is needed along with other components to meet this desired end. The need for the first capacitor 203 and other components for line filtering is known to those skilled in the art.

In illustrative embodiments, the diode 205 may be a Schottky diode or a pn junction diode. As described more fully herein, the diode 205 allows the second capacitor 204 to function as an alternative energy storage device to provide power to from the AC-DC converter 103 to the load 206 and other components when the voltage on capacitor 203 falls below a threshold voltage. Other known rectifying devices are also contemplated for this purpose. For example, a field effect transistor (FET) switch could also be used.

The connection between the load 206 and the AC-DC converter circuit 103 is via the switching apparatus 207. As noted previously, the switching apparatus 207 is a conceptual manifestation of various switching functions of the power supply 102. However, the present teachings contemplate a stand-alone switching apparatus 207 implemented in hardware. Illustratively, the switching apparatus 207 first and second switches 208, 209 could be implemented though FET or micro-electro-mechanical systems (HEMS) switches. In such a stand-alone implementation, the load 206 may be connected to and thus not part of the switching apparatus 207.

When the switching apparatus 207 is implemented as a stand-alone switching apparatus, the control of the switches 208 and 209 is via a controller 210 that includes a voltage level sensor. Controller 210 compares the voltage across the first capacitor 203 to a reference voltage. The reference voltage may be generated using a bandgap voltage reference, a zener diode, or other known techniques. When the voltage on the first capacitor 203 falls below a threshold, the load 206 is switched from drawing power from the first capacitor 203 to drawing power from the second capacitor 204. As such, the controller 210 disengages the first switch 208 and engages the second switch 209.

In an embodiment, the controller 210 may include an operational amplifier as part of a comparator circuit adapted to compare two voltages. One voltage could be generated by a zener diode and the other could be the sensed voltage of capacitor 203. These and other comparator circuits within the purview of one skilled in the art may be implemented to realize the controller 210 and its desired function.

As alluded to previously, in known converter circuits, the capacitance and required energy sourcing of capacitors filtering full wave bridge rectifier circuits are comparatively large. For example, in a known circuit, a power converter with an overall 50% efficiency and an output power of 3.5 W using an input AC-DC converter circuit 103 with a voltage droop of 80 V, a peak AC input voltage of 120 V, a droop time (Δt) of one-quarter cycle at 60 Hz (4.2 ms) will require a minimum capacitor value of approximately 6.1 µF. Normally in such known circuits, a capacitor having a capacitance of 10 µF to 14 µF may be required to reduce the voltage droop to a more acceptable voltage to ensure proper function of the switching regulator. As will be readily appreciated by one of ordinary skill in the art, capacitors with capacitance of the magnitude required in known AC-DC converter circuits are comparatively dimensionally large and thus not practical for use in many comparatively small portable electronic devices.

By contrast, and as described more fully herein, the AC-DC converter circuit 103 of the example embodiments requires capacitors 203, 204 to be substantially smaller in capacitance than those required in known circuits, while providing adequate voltage droop prevention. Capacitors contemplated for use in circuit 102 are thus significantly smaller in dimension than those required in known circuits, fostering integration of the circuit 102 into the portable electronic device 101.

Illustratively, for a droop of approximately 80V over a time interval of 0.83 msec, power supply efficiency of 50%, input AC peak voltage of 100V, the second capacitor 204 has a capacitance of at least approximately 1.2 µF. More generally, in accordance with the example embodiments, the portion of the rectified voltage period over which the current is drawn from the second capacitor 204 is approximately 25% or less. In an illustrative 120 Hz rectified voltage signal this equates to a droop time (Δt) of approximately 2.1 ms. The portion of the rectified voltage period during which the current is drawn from the second capacitor 204 may be less than approximately 20%, or less than approximately 15%, or less than 10%, or less than 5%.

Figure 2C:
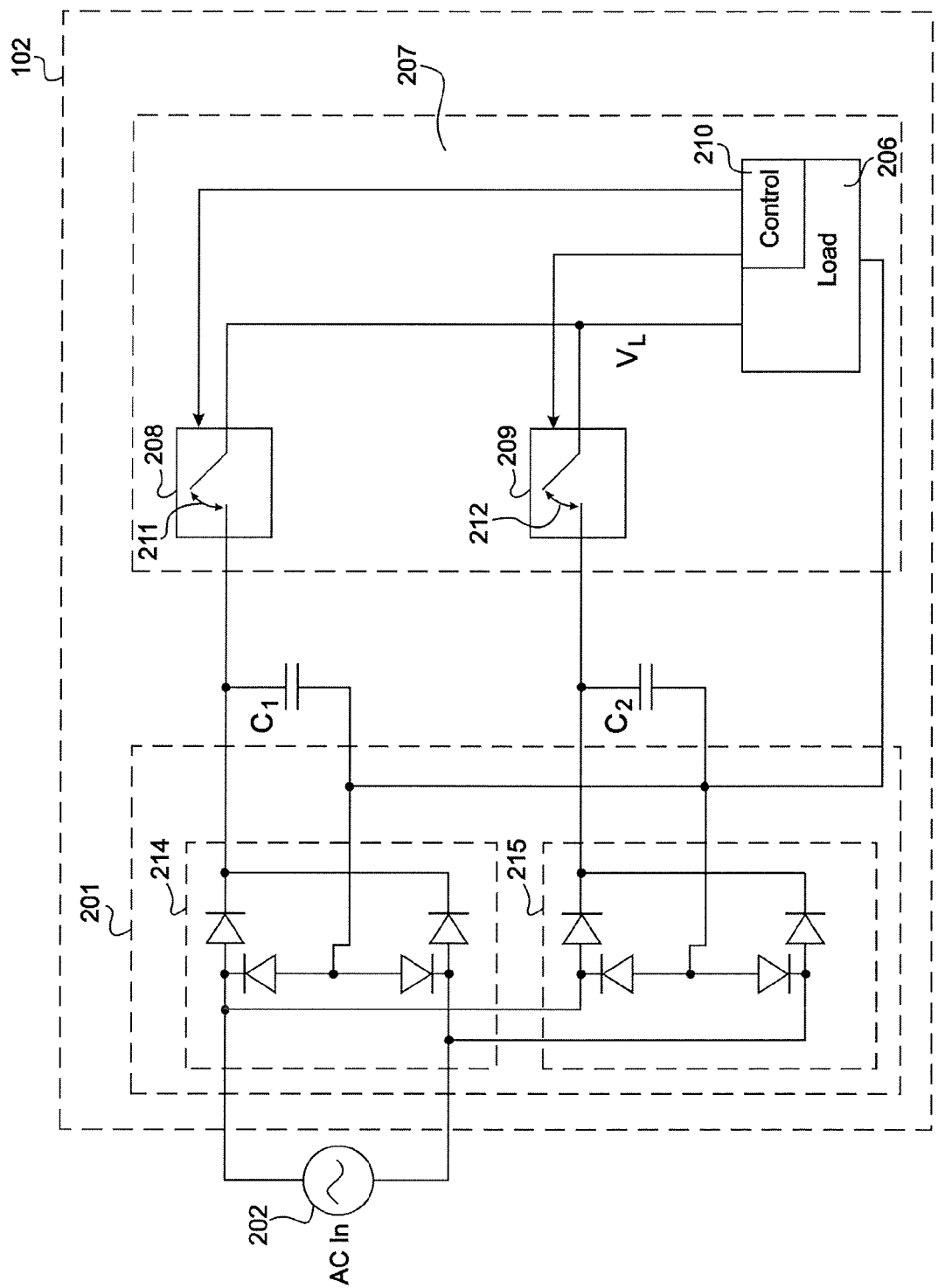

In the embodiment of FIG. 2C, a first rectifier circuit 214 and a second rectifier circuit 215 charge first and second capacitors 203 and 204, respectively. In the illustrative embodiments of FIG. 2C, the rectifier circuits 214 and 215 comprise rectifier circuit 201. Many of the details of the embodiment of FIG. 2C are common to those described in connection with the embodiments of FIGS. 2A and 2B. These details are not repeated.

Figure 3A:
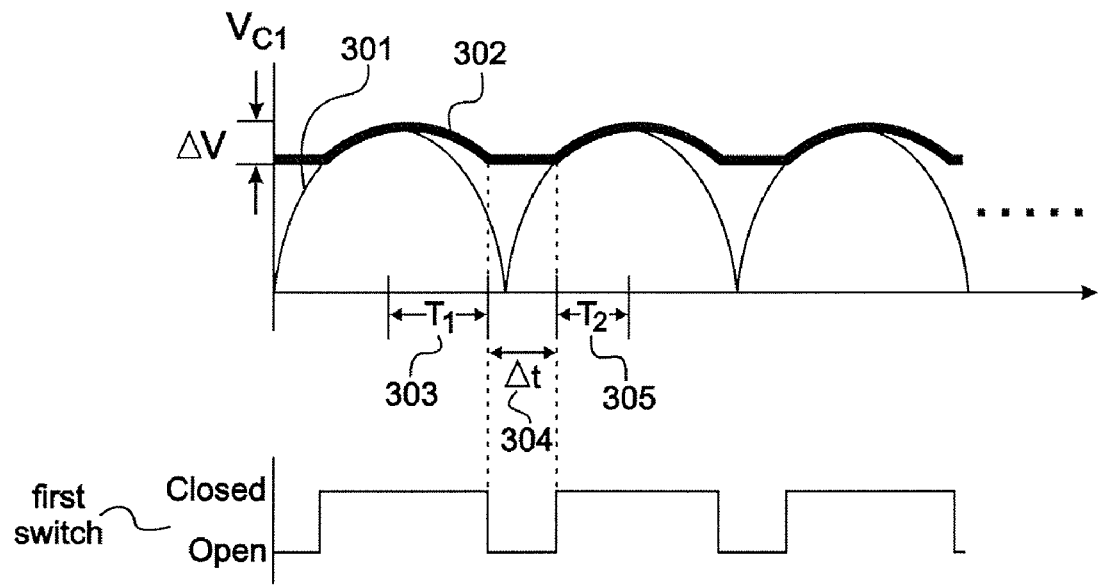
FIGS. 3A-3C are graphical representations of voltage output versus time of a circuit accordance with example embodiments.
Figure 3B:
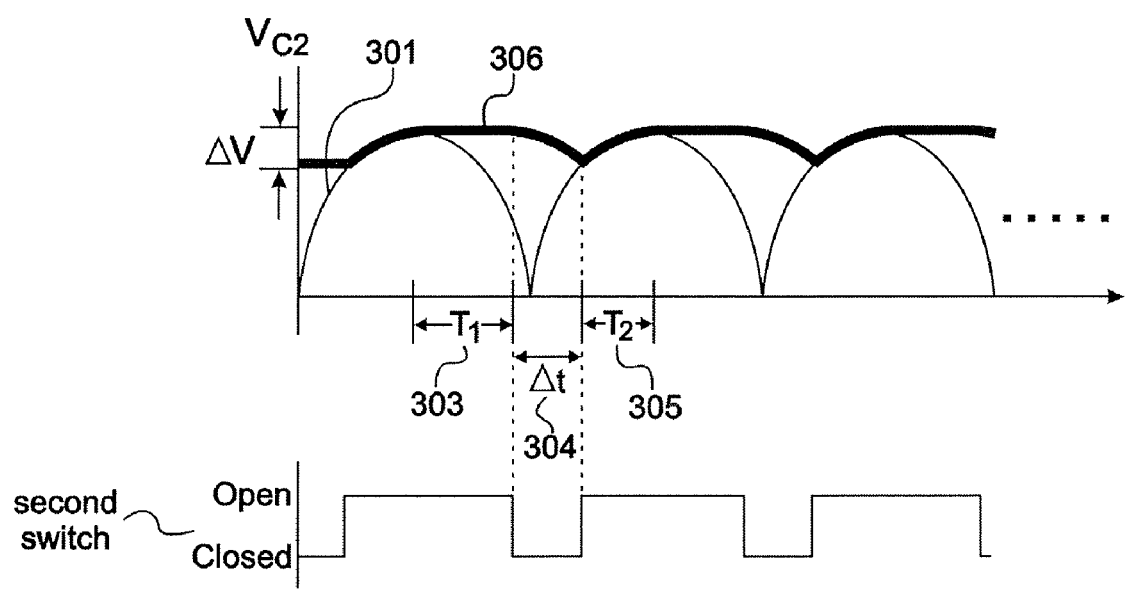
Figure 3C:
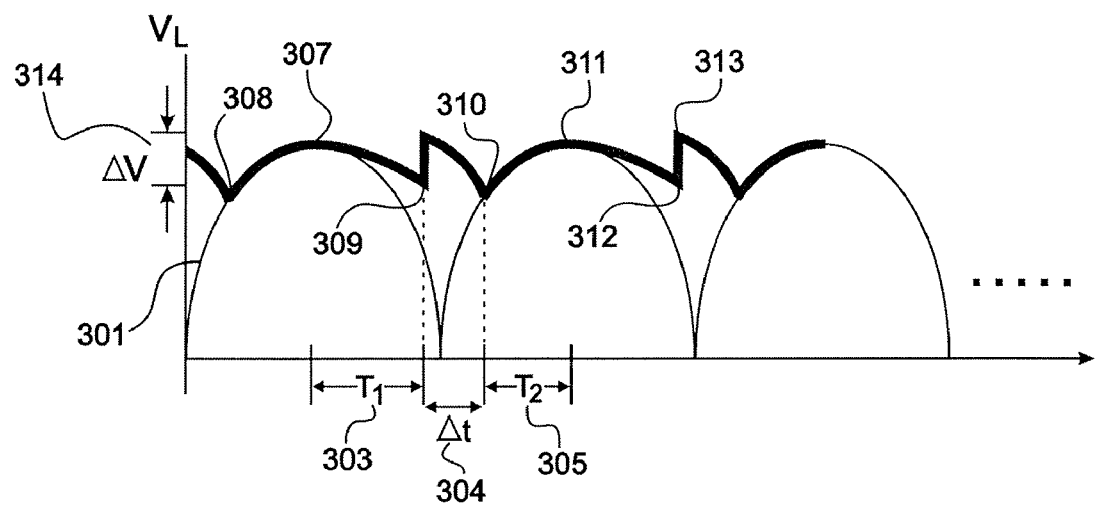

FIGS. 3A-3C are graphical representations of certain voltages versus time provided by circuits of the example embodiments. In the interest of clarity of description, the description of FIGS. 3A-3C should be reviewed in the context of the example embodiments described in conjunction with FIG. 2B. However, the descriptions may be reviewed in context of the embodiments of FIGS. 2A and 2C.

FIG. 3A is a graphical representation of the voltage ($V_{C1}$) across the first capacitor 203 of the AC-DC converter circuit 103 over time. The voltage across first capacitor 203 is shown as voltage waveform 302. A full wave rectified voltage waveform 301 provided by the rectifier circuit 201 implemented with a full bridge rectifier without the first and second capacitors 203 and 204, is superposed for comparative purposes on voltage waveform 302. The state of the first switch 208 versus time is shown immediately beneath the graph of voltage waveforms 301 and 302.

During a time interval T1 303, the rectified AC voltage on capacitor 203 drops and the first capacitor 203 discharges and sources energy to certain components of the power supply 102, such as the load 206. During the time interval Δt 304, the first capacitor 203 is not sourcing energy to the components of the power supply 102 such as the load 206 and is not charging or discharging. During a time interval T2 305, the first capacitor 203 is charging from the AC input through the rectifier circuit 201; and the rectifier circuit 201 is sourcing energy to the load 206.

FIG. 3B is a graphical representation of the voltage across the second capacitor 204 of the AC-DC converter circuit 103 over time. The voltage across the second capacitor 204 is shown as voltage waveform 306. The full wave rectified voltage waveform 301 provided superposed for comparative purposes on the voltage waveform 306. The state of the second switch 209 versus time is shown beneath the graph of voltage waveforms 301 and 302.

During the period of time T1 303, the second capacitor 204 is charged and is not sourcing energy. During the time interval Δt 304, the second capacitor 204 is discharging and sourcing energy to certain components of the power supply 102, such as the load 206. During the period of time T2 305, the second capacitor 204 is charging from the rectifier circuit 201.

FIG. 3C is a graphical composite representation of the voltage available to power the load 206 (load voltage $V_L$) versus time for the AC-DC power converter circuit 103 in accordance with an example embodiment. Voltage $V_L$ is shown as voltage waveform 307 which is a composite of waveforms 302 and 306. A full wave rectified voltage waveform 301 is again superposed for comparative purposes on the graph of $V_L$ versus time.

At point 308 of a voltage waveform 307, and as shown in FIGS. 3A and 3B, the first switch 208 is closed and the second switch 209 is open. During the period of time T1 303 the second capacitor 204 is charged and is not sourcing energy to the load 206. As noted above, the first capacitor 203 is charged and then discharged during this interval of time. Just prior to the period of time T1 303, the second capacitor 204 has been charged to the maximum voltage of the AC line source. When the rectified AC line voltage drops below its maximum level, with the second capacitor 204 at the maximum rectified AC line voltage, the diode 205 is reverse biased. The first capacitor 203, which was also charged to the maximum rectified AC line voltage, begins to discharge to the load and the AC source supplies no current to the load.

At point 309 of the curve, which corresponds to the termination of the time interval T1 303, the first switch 208 is opened and the second switch 209 is closed. In an illustrative embodiment, the voltage level sensor of the controller 210 senses that the output voltage has dropped to a threshold voltage and disengages the first switch 208 and engages the second switch 209.

Because the diode 205 is reversed biased during time interval T1 303, the second capacitor 204 retains its charge and thus is charged to the maximum rectified AC line voltage at point 309. With the second switch 209 engaged, the second capacitor 204 begins to discharge by providing power to certain components of the power supply 102 such as the load 106. From point 309 to point 310, which corresponds to the time interval $\Delta t$ 304, diode 205 remains reverse biased and the voltage at the load is set by the voltage across the second capacitor 204. As will be appreciated, the time interval $\Delta t$ 304 is the droop time described previously.

At the termination of the time interval $\Delta t$ 304, the rectified AC input voltage surpasses the voltage on capacitor 204 and the controller 210 disengages the second switch 209 and engages the first switch 208. Notably, the threshold voltage at point 310 is the minimum input voltage needed by the switching regulator to provide suitable switching. Beginning at point 310, with the second capacitor 204 discharged to a lower voltage and the rectified AC line voltage increasing, the diode 205 is forward biased. In this state, the AC line source provides current to certain components of the power supply 102, such as the load 206; and to the first capacitor and second capacitors 203, 204.

In the transition between point 310 and point 311 of the voltage waveform 307, the rectified AC source voltage increases to a maximum value. At point 311, the second capacitor 204 is charged to the maximum rectified AC line voltage and the voltage from the rectifier 201 begins to drop. This voltage drop results in a reverse bias across the diode 205 and the first capacitor 203 begins to discharge providing power to the load 206. At point 312, like point 309, the voltage $V_L$ has dropped to approximately the threshold voltage. The control 210 senses the voltage level on capacitor 203 is at a threshold value and disengages the first switch 208 and engages the second switch 209. At point 313, with a voltage substantially the same as the peak rectified AC line voltage, the second capacitor 204 begins to discharge as described previously.

The embodiments described in connection with FIGS. 2A-3C results in maintaining the voltage to the switching regulator circuit at or above a threshold voltage to ensure sufficient power is available to the isolation transformer. Beneficially, the AC-DC converter circuit 102 provides this voltage using comparatively small capacitance capacitors 203, 204 having comparatively small capacitance values and comparatively small power ratings. To this end, a voltage droop $\Delta v$ 314 occurs over (droop) time interval $\Delta t$ 304. The voltage droop $\Delta v$ is equal to the maximum rectified AC line voltage minus the threshold voltage. For a 120V rectified AC line voltage and a 50 V threshold voltage, this equates to $\Delta v$=70V. In a specific embodiment, this corresponds to a droop time of less than approximately 14% of the period of a 60 Hz AC line voltage.

As described above, during this time the second capacitor 204 is providing current to the load. Notably, the time interval $\Delta t$ 304 is comparatively small and thus the power rating and capacitance of the second capacitor 204 may be relatively small. This translates to a dimensionally small capacitor, which fosters integration of the AC-DC converter 103 with the power supply 102; and in a specific embodiment the integration of the power supply 102 into a portable electronic device.

In example embodiments, time interval $\Delta t$ 304 represents the portion of the rectified voltage period during which the current is drawn from the second capacitor 204. In the illustrative embodiments, time interval $\Delta t$ 304 represents less than approximately 25%, or less than approximately 20%, or less than approximately 15%, or less than 10%, or less than 5% of the rectified voltage period of waveform 301.

Furthermore, during a portion of the rectified AC line voltage during period of time 305, the current to certain components of the power supply 102, such as the load 206 is supplied primarily from the rectifier circuit 201. As noted, the first capacitor 203 discharges when the rectified AC voltage begins to drop. The effect of reducing the size of the capacitor 203 is further illustrated in FIGS. 4A-4C. Again, this translates to a dimensionally small capacitor, which fosters a dimensionally smaller AC-DC converter 103. Thus, the power supply 102 may be made dimensionally smaller. As will be appreciated, reducing the dimensional size of the power supply 102 may be useful in embodiments where the power supply is integrated into the portable electronic device 101; or in embodiments where the power supply is a stand-alone device.

Figure 4A:
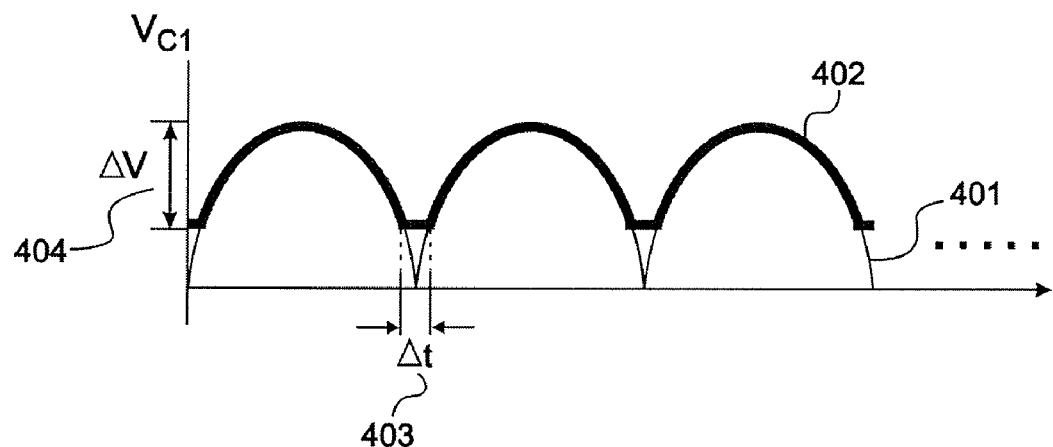
FIGS. 4A-4C are graphical representations of voltage output versus time of a circuit accordance with example embodiments.

FIG. 4A is graphical representation of a voltage waveform 402 across the first capacitor 203 of the AC-DC converter circuit 103 over time. As in connection with FIGS. 3A-3C, a voltage waveform 401 of a full bridge rectifier is superposed over the voltage waveform 402 for comparative purposes. In the present embodiment, the capacitance of the first capacitor 203 is comparatively small so that it discharges at substantially the same rate as the AC input voltage is falling. As noted previously, the first capacitor 203 is optional but generally included to provide filtering of noise on the AC input line voltage. If the first capacitor 203 is omitted, the analysis presented here remains substantially unchanged. Notably, capacitor 203 is comparatively smaller since it is not required to source the power to the load 206.

Figure 4B:
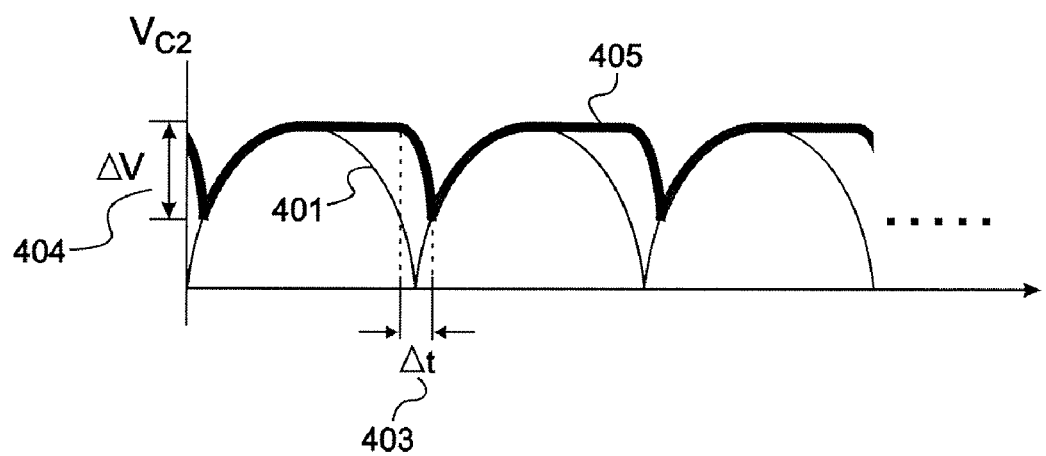
Figure 4C:
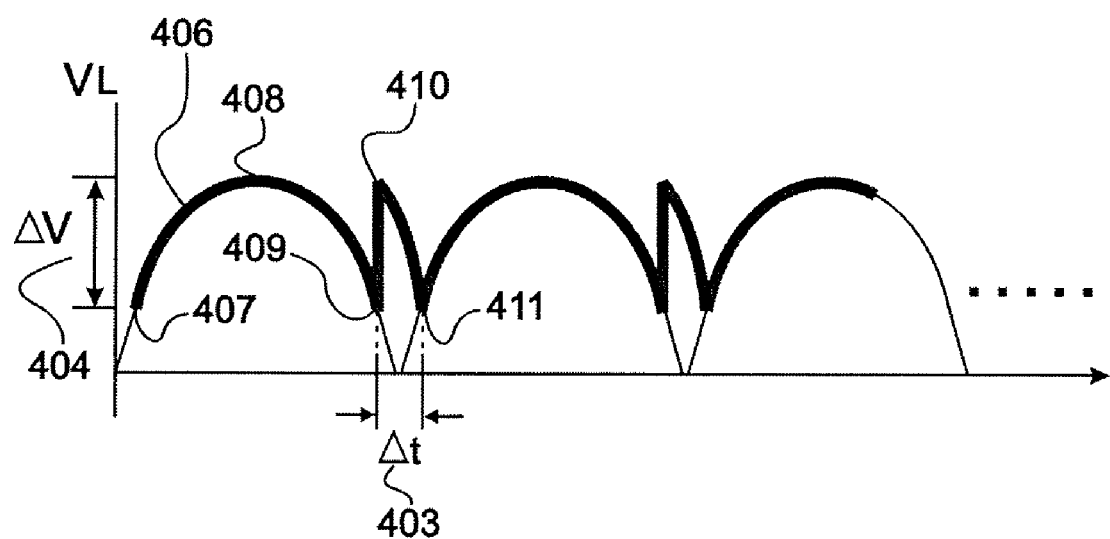

FIGS. 4A-4C illustrate the design of a power supply 102 with a comparatively lower threshold voltage. Because the lower threshold voltage changes the time when the voltage on capacitor 203 falls below the threshold and therefore when the switches 208, 209 engage, the capacitance of the second capacitor 204 is comparatively smaller. As such, the time interval $\Delta t$ 403 is smaller than the time interval $\Delta t$ 304, resulting in a comparatively larger voltage droop $\Delta v$ 404. Notably, the state of the first and second switches 208, 209 is substantially the same as described in FIGS. 3A-3C, and is described more fully in conjunction with FIG. 4C.

FIG. 4B is graphical representation of a voltage waveform 405 across the second capacitor 204 of the AC-DC converter circuit 103 over time. Because the time interval $\Delta t$ 403 is smaller compared to the time interval $\Delta t$ 304 of FIG. 3B, a smaller capacitance for the second capacitor 204 is realized. The second capacitor 204 also has a comparatively larger discharge range ($\Delta v$ 404) over the time interval $\Delta t$ 403 assuming the same load 206.

FIG. 4C is a graphical representation of voltage waveform $V_L$ 406 across the load 206 versus time in accordance with another example embodiment. At point 407, the first switch 208 is closed and the second switch 209 is opened. The diode 205 is forward biased and the second capacitor 204 begins to charge. In the embodiment where the first capacitor 203 is present but small in magnitude, the first capacitor 203 is also charged. However, in the event where the first capacitor 203 is present, its capacitance is small and its contribution to the load current during discharge beginning at the peak voltage rectified AC line voltage is limited.

From point 407 to point 408, certain components of the power supply 102 such as the load 206 are driven substantially by the rectified AC line voltage. At point 408, the maximum rectified AC line voltage is reached and the second capacitor 204 is charged to this voltage. Also, at point 408, the rectified AC line voltage begins to drop, and because the voltage at the second capacitor 204 is greater than the line voltage in this transition, the diode 205 is reverse biased. At point 409, the threshold voltage for the suitable function of switching regulator is reached. The voltage level sensor of the controller 210 engages the second switch 209 and disengages the first switch 208. At point 410, the second capacitor 204 begins to discharge from the maximum rectified AC line voltage through the components of the power supply 102.

The second capacitor 204 discharges over time Δt 403 and the voltage $V_L$ drops by Δv 404. At point 411, the minimum voltage is again reached. The voltage level sensor of the control 210 disengages the second switch 209 and engages the first switch 208. Additionally, at point 411, the voltage drop across the diode is positive, the diode 205 is forward biased, and the voltage from the rectifier circuit begins to increase. As can be appreciated, the sequence repeats.

In the example embodiments described in connection with FIGS. 4A-4C, the threshold voltage is comparatively low. For example, the threshold voltage is illustratively 20 V. From a nominal 120 V rectified AC line voltage, this corresponds to a droop voltage Δv 404 of approximately 100 V. The time interval Δt 403 is correspondingly smaller equivalent to less than apprximately 6% of the period of a 60 Hz AC line voltage.

Figure 5A:
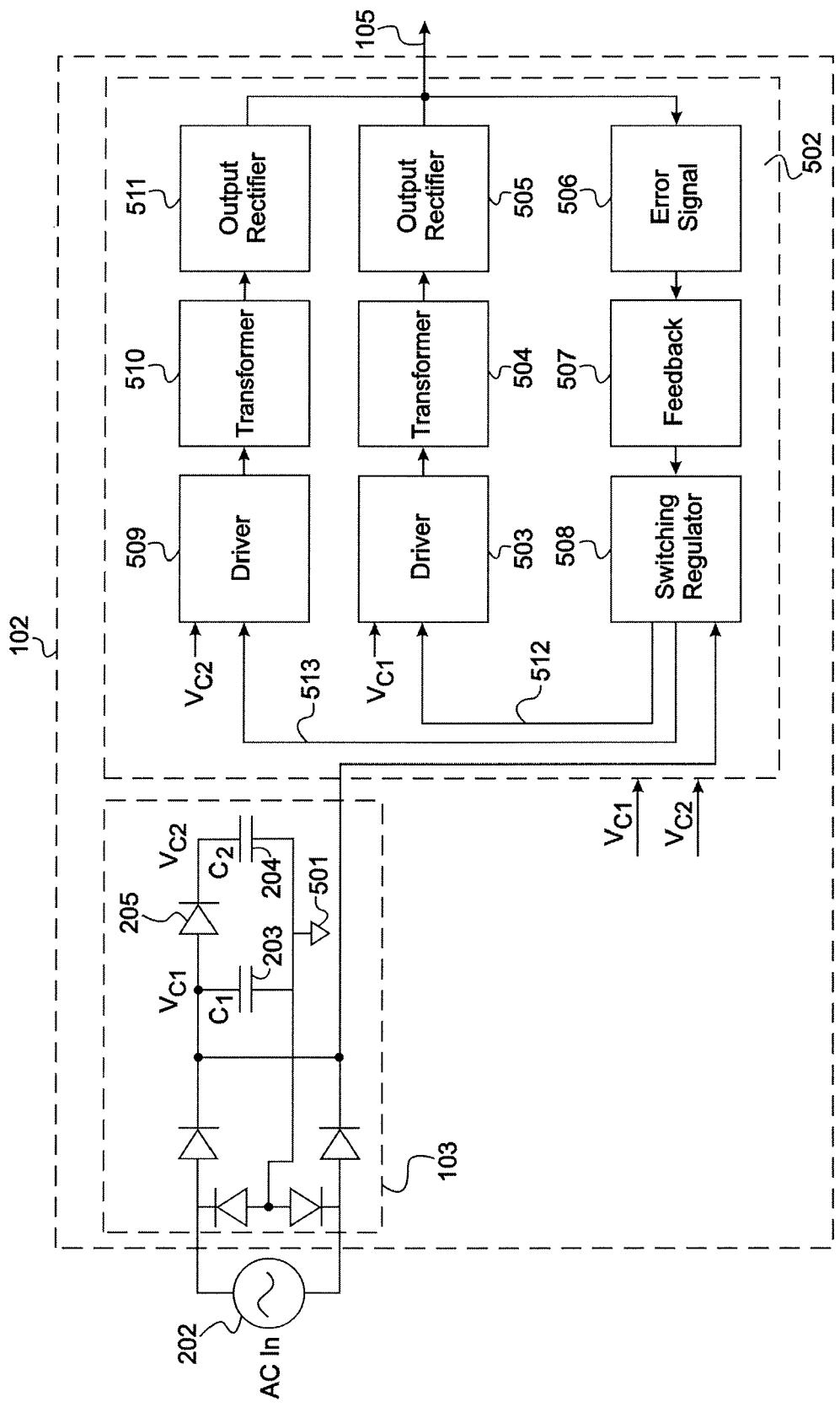
FIGS. 5A-5C are simplified block diagrams of power supply circuits in accordance with example embodiments.
Figure 5B:
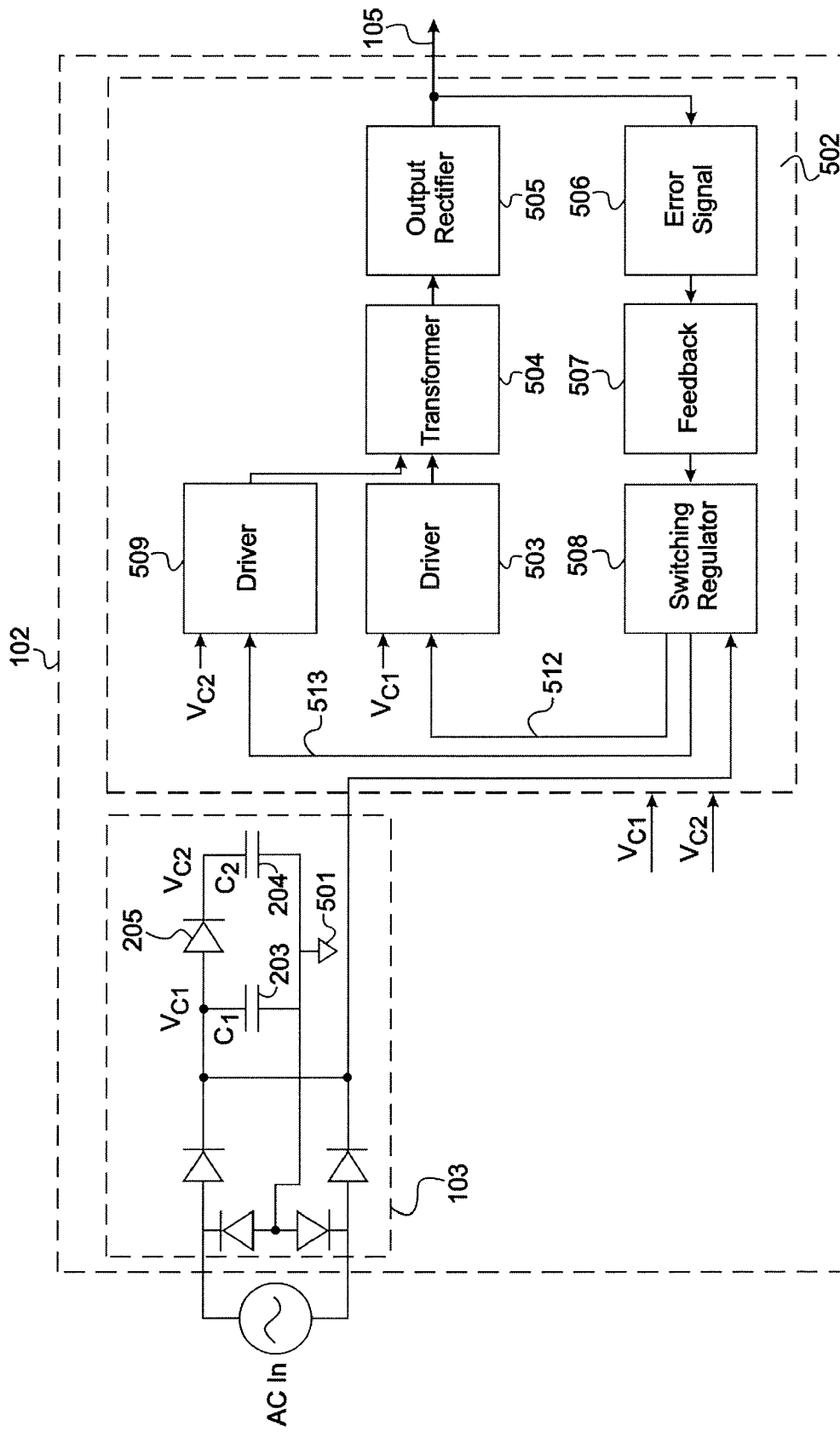
Figure 5C:
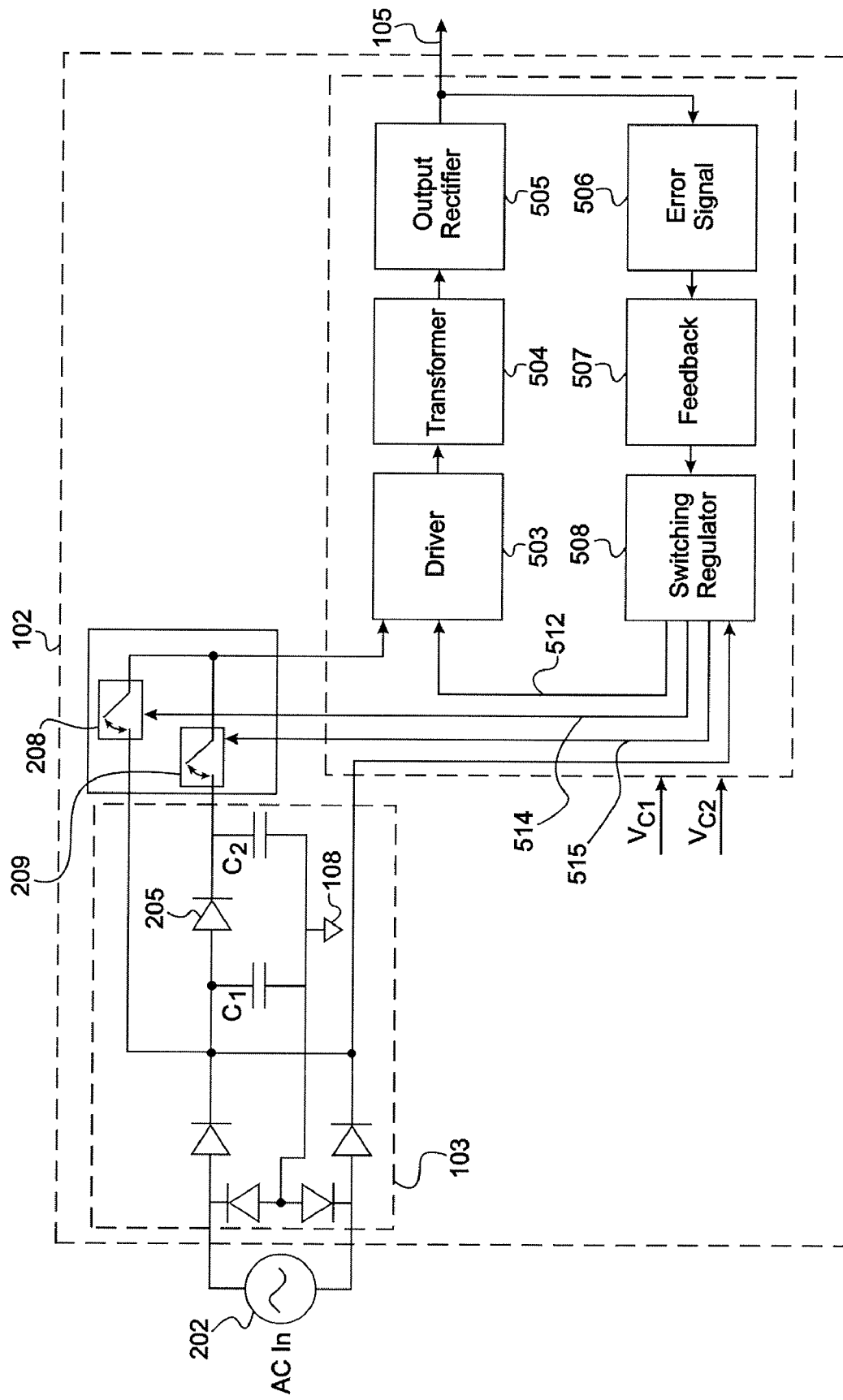

FIGS. 5A-5C are simplified schematic diagrams of power supply circuits 102 including the AC-DC converter circuit 103 in accordance with example embodiments. Many of the details of the components of the power supply 102 are provided in connection with the example embodiments of FIGS. 1-4C and in the incorporated application to Unkrich, et al. Many of these details are not repeated to avoid obscuring the description of the present example embodiments. Notably, voltages $V_{C1}$, $V_{C2}$ and the threshold voltage are referenced relative to ground 501.

FIG. 5A is a simplified schematic diagram of a power supply circuit of an example embodiment. The AC-DC converter 103 of the example embodiments provides the source of power from the AC input 202 to the rest of power supply 102 consisting of a DC-DC converter circuit 502 and power sourced at the output voltage 105. The converter circuit 502 comprises a first driver 503; a first transformer 504; a first output rectifier 505; a voltage error signal circuit 506; an isolated feedback circuit 507; a switching regulator 508; a second driver 509; a second transformer 510; and a second output rectifier 511. Many details of the components of the converter circuit 502 and their function are provided in the incorporated application to Unkrich, et al.

The connections from AC-DC converter circuit 103 to supply power are to the first and second capacitors 203 and 204, which are respectively labeled $V_{C1}$ and $V_{C2}$ relative to ground 501. As noted previously, the switching apparatus 207 comprises components of the load 206, which includes components of the DC-DC converter circuit 502. The operation of the DC-DC converter circuit 502 of example embodiments, and thus the operation of the switching apparatus 207, is described presently.

The first driver 503, the first transformer 504 and the first output rectifier 505 are part of a primary power signal flow path isolating and transforming the input DC voltages, which are the voltage signals $V_{C1}$ and $V_{C2}$, to the output supply voltage 105. The voltage error signal circuit 506, the isolated feedback circuit 507, and the switching regulator 508 are part of the feedback path including the error voltage generation, isolation feedback of the error voltage correction signal, and the switching regulation, which controls and modulates the operation of the power signal path by controlling the operation of power into the first transformer 504 via a primary control signal 512.

In accordance with example embodiments, independent control of the drawing of power from either the first capacitor 203 or the second capacitor 204 is effected by two paths between the respective capacitor and the output. In an embodiment shown in FIG. 5A, the power signal flow path is replicated and the output of each is connected together. Since the last block is the output rectifier 505, direct connection between the two power signal paths is provided at their respective outputs.

In operation, the switching regulator 508 turns on one path or the other allowing power to be transferred along one path or the other. The first driver 503, the first transformer 504 and the first output rectifier 505 comprise the primary power signal flow path. The second driver 509, second transformer 510 and second output rectifier 511 comprise a secondary power signal flow path. When the secondary power signal path is needed, the switching regulator 508 provides a secondary control signal 513.

The switching regulator circuit 508 independently controls the two forward path power transformer circuits and controls when to switch between the primary and secondary power signal flow paths. The primary power signal flow path provides the power from capacitor 203 until the voltage falls below a reference threshold voltage. This function of generating the reference threshold voltage, comparing the capacitor 203 voltage $V_{C1}$ to the reference threshold voltage, and implementing the control is implemented in the switching regulator. When the voltage on capacitor 203 has fallen below this threshold, the switching regulator 508 switches the power signal flow to the secondary power transformation signal path. This continues until the rectified AC line voltage again begins to charge the first capacitor 203 and bring its voltage above a second threshold.

The second threshold voltage is substantially the same as the first threshold voltage but typically some hysteresis or a higher voltage than the original threshold would be used to allow for noise and voltage margin.

The embodiment described in connection with FIG. 5A illustrates the function of the switching apparatus 207 that is switching from one power signal flow path to another to maintain a voltage output 105 to its designed value. Another embodiment illustrating the function of the switching apparatus is described presently.

FIG. 5B is a simplified schematic diagram of a power supply circuit 102 including the AC-DC converter circuit 103 in accordance with an example embodiment. In the present embodiment, the power supply 102 is realized in a comparatively smaller size by combining the primary and secondary power signal flow paths before the output. A common technique to do this combining in DC-DC power converters is to include two independent primary side windings on magnetic isolation transformers. In this case, the first and second drivers 503, 504 are provided and the isolation transformer input winding is duplicated. However, only one magnetic transformer and one output regulator circuit are required.

In an embodiment in which the transformer 503 is an isolated acoustic transformer, two independent input transducers are required.

The basic operation of the power supply 102 of the embodiments of FIG. 5B is similar to that of FIG. 5A, excepting the first and second drivers 503, 509 drive the transformer 504 alternately.

FIG. 5C is a simplified schematic diagram of a power supply circuit 102 including the AC-DC converter circuit 103 in accordance with an example embodiment. In the present embodiment, switching is carried out via the first and second switches 208, 209, which in combination with control from the switching regulator 508 comprise the switching circuit of an example embodiment. In operation, the first switch 208 is closed and the second switch is opened to provide power from the AC-DC converter circuit 103 as described previously. When the threshold voltage is reached, the first switch is opened and the second switch is closed to provide power from the AC-DC converter circuit 103 also as described previously.

This controlled opening and closing of the first and second switches provides voltages $V_{C1}$ and $V_{C2}$ to the DC-DC converter 502 in a selective manner. In such an embodiment, the switching regulator 508 switches the power signal flow path via the selected switches via switching signal paths 514 and 515, which are transmitted to the first switch 208 and the second switch 209, respectively.

Only the primary power signal flow path is required if the FET or MEMs switch is used to connect and disconnect capacitors 203 and 204 alternatively to the rest of the circuit. In the illustrative embodiment described presently, the first and second switches 208, 209 may be FET switch circuits, or MEMS switches, or both. In such an embodiment, the switching regulator 508 switches the power signal flow path via the selected switch. Only the primary power signal flow path is required if the FET or MEMs switch is used to connect and disconnect capacitors 203 and 204 alternatively to the rest of the circuit.

In accordance with example embodiments, an AC-DC converter circuit and a power supply are described. In certain embodiments, the AC-DC converter and the power supply are adapted for integration into a portable electronic device including an integrated power supply are described. Beneficially, the AC-DC converter includes components that are comparatively small in dimension but provide the requisite electrical performance by virtue of present teachings. One of ordinary skill in the art appreciates that many variations that are in accordance with the present teachings are possible and remain within the scope of the appended claims. These and other variations would become clear to one of ordinary skill in the art after inspection of the specification, drawings and claims herein. The invention therefore is not to be restricted except within the spirit and scope of the appended claims.

The invention claimed is:

1. An AC-DC converter, comprising:
    a first capacitor and a second capacitor; and
    a rectifier circuit connected to the first and second capacitor and operative to charge both the first and the second capacitor and to discharge the first capacitor independently of the second capacitor, wherein the AC-DC converter circuit provides a rectified output voltage, and current is drawn from the second capacitor only for a duration of time less than approximately 25% of each period of the rectified output voltage.

2. An AC-DC converter as recited in claim 1, wherein the current is drawn from the second capacitor only for a duration of time less than approximately 20% of the period of the rectified output voltage.

3. An AC-DC converter as recited in claim 1, wherein the AC-DC converter is a component of a power supply.

4. An AC-DC converter as recited in claim 3, wherein the power supply is integrated into a portable electronic device.

5. An AC-DC converter as recited in claim 4, wherein the power supply includes an acoustic transformer.

6. An AC-DC converter as recited in claim 3, wherein the power supply includes an acoustic transformer.

7. An AC-DC converter as recited in claim 3, wherein the power supply further comprises:
    a switching apparatus operative to engage a primary power signal flow path that provides power from the first capacitor until an output voltage reaches a threshold voltage.

8. An AC-DC converter as recited in claim 7, wherein the switching apparatus is operative to disengage the primary power signal flow path when the first capacitor voltage reaches the threshold voltage and to engage a secondary power signal flow path that provides power from the second capacitor.

9. An AC-DC converter as recited in claim 1, wherein the current is drawn from the second capacitor only for a duration of time less than approximately 10% of the period of the rectified output voltage.

10. An AC-DC converter as recited in claim 1, wherein the current is drawn from the second capacitor only for a duration of time less than approximately 5% of the period of the rectified output voltage.

11. An AC-DC converter of a power supply, the AC-DC converter comprising:
    a first capacitor;
    a second capacitor, the first capacitor being configured to discharge independently of the second capacitor; and
    a rectifier circuit connected to the first and second capacitors, the rectifier circuit being configured to provide a rectified AC output voltage for charging the first and second capacitors,
    wherein current from the second capacitor is provided to a load when a voltage across the first capacitor drops below a threshold voltage level, and
    wherein the only portion of each period of the rectified AC output voltage over which the current is provided by the second capacitor is approximately 25% or less.

12. An AC-DC converter as recited in claim 11, wherein the only portion of each period of the rectified AC output voltage over which the current is provided by the second capacitor is approximately 20% or less.

13. An AC-DC converter as recited in claim 11, wherein the only portion of each period of the rectified AC output voltage over which the current is provided by the second capacitor is approximately 15% or less.

14. An AC-DC converter as recited in claim 11, wherein the only portion of each period of the rectified AC output voltage over which the current is provided by the second capacitor is approximately 10% or less.

15. An AC-DC converter as recited in claim 11, wherein the only portion of each period of the rectified AC output voltage over which the current is provided by the second capacitor is approximately 5% or less.

16. An AC-DC converter as recited in claim 15, wherein the third portion is approximately 10% or less of each period of the rectified AC output voltage.

17. An AC-DC converter as recited in claim 15, wherein the third portion is approximately 5% or less of each period of the rectified AC output voltage.

18. An AC-DC converter of a power supply, the AC-DC converter comprising:
    a first capacitor;
    a second capacitor, the first capacitor being configured to discharge independently of the second capacitor; and
    a rectifier circuit connected to the first and second capacitors, the rectifier circuit being configured to provide a rectified AC output voltage for charging the first and second capacitors,
    wherein the second capacitor is configured to charge during a first portion of each period of the rectified AC output voltage, to maintain charge during a second portion of each period of the rectified AC output voltage, and to discharge during a third portion of each period of the rectified AC output voltage when a voltage across the first capacitor drops below a threshold level, the third portion being approximately 25% or less of each period of the rectified AC output voltage.

19. An AC-DC converter as recited in claim 18, wherein the third portion is approximately 20% or less of each period of the rectified AC output voltage.

20. An AC-DC converter as recited in claim 18, wherein the third portion is approximately 15% or less of each period of the rectified AC output voltage.

* * * * *